US012331560B2

(12) United States Patent
Marshall

(10) Patent No.: US 12,331,560 B2
(45) Date of Patent: Jun. 17, 2025

(54) MOTOR CONTROL FOR POWERED CLOSURE WITH ANTI-PINCH

(71) Applicant: TriMark Corporation, New Hampton, IA (US)

(72) Inventor: Glen A. Marshall, Waverly, IA (US)

(73) Assignee: TriMark Corporation, New Hampton, IA (US)

( * ) Notice: Subject to any disclaimer, the term of this patent is extended or adjusted under 35 U.S.C. 154(b) by 743 days.

(21) Appl. No.: 16/443,428

(22) Filed: Jun. 17, 2019

(65) Prior Publication Data

US 2020/0392766 A1 Dec. 17, 2020

(51) Int. Cl.

*E05B 81/64* (2014.01)
*E05B 81/06* (2014.01)

(Continued)

(52) U.S. Cl.

CPC .............. *E05B 81/64* (2013.01); *E05B 81/06* (2013.01); *E05B 81/14* (2013.01); *E05B 81/21* (2013.01);

(Continued)

(58) Field of Classification Search

CPC .......... E05B 81/20; E05B 81/21; E05B 81/22; E05B 81/64; Y10T 292/699

See application file for complete search history.

(56) References Cited

U.S. PATENT DOCUMENTS 3,591,150 A * 7/1971 Weatherston ........... F23D 14/34 126/110 C
3,601,675 A * 8/1971 Radtke ................. G05D 23/275 318/284

(Continued)

FOREIGN PATENT DOCUMENTS

DE 19944554 A1 3/2001
DE 10315188 A1 3/2004

(Continued)

OTHER PUBLICATIONS

European Union, "Council Directive No. 74/60/EEC of Dec. 17, 1973 on the approximation of the laws of the Member States relating to the interior fittings of motor vehicles (parts in the passenger compartment—with the exception of interior rear-view mirrors—, location of controls, roof and sunroof, backrest and rear part of the seats," Official Journal of the European Communities, 1974, Article No. 38, 20 pages.

Nitsche et al. "Direct Sensor Solutions for Anti Pinch and Collision Avoidance for Motorized Closures," SAE International: SAE technical papers, 2009, pp. 15-23.

(Continued)

*Primary Examiner* — Christine M Mills
*Assistant Examiner* — Faria F Ahmad
(74) *Attorney, Agent, or Firm* — McKee, Voorhees & Sease, PLC

(57) ABSTRACT

A controller system is provided for a motorized moveable striker assembly on a vehicle door or window. The assembly includes a striker on the door post which is moveable by an electric motor between extended and retracted positions. A latch on the door releasably engages the striker. Switches in the latch sends signals to the controller to actuate the motor. After the latch is engaged, the controller retracts the striker from the extended position to fully close the door. When the latch is disengaged from the striker, the latch switch sends a signal to controller to actuate the motor so as to extend the striker from the retracted position to the extended position as to prepare for the next door closing. Anti-pinching control and temperature compensation is also provided.

8 Claims, 20 Drawing Sheets

(51) Int. Cl.

| | |
|---|---|
| ***E05B 81/14*** | (2014.01) |
| ***E05B 81/20*** | (2014.01) |
| ***E05B 81/22*** | (2014.01) |
| ***E05B 81/44*** | (2014.01) |
| ***E05B 83/36*** | (2014.01) |
| ***E05B 85/04*** | (2014.01) |

(52) U.S. Cl.

CPC .............. *E05B 81/22* (2013.01); *E05B 81/44* (2013.01); *E05B 83/36* (2013.01); *E05B 85/04* (2013.01); *E05Y 2400/552* (2013.01); *E05Y 2900/531* (2013.01)

(56) References Cited

U.S. PATENT DOCUMENTS

| | | | | | |
|---|---|---|---|---|---|
| 3,722,615 | A * | 3/1973 | Okada | E05B 77/54 | 70/264 |
| 3,727,348 | A * | 4/1973 | Steinmann | E05F 15/47 | 200/61.43 |
| 4,342,379 | A * | 8/1982 | Games | G05B 19/416 | 318/617 |
| 4,347,465 | A * | 8/1982 | Goertler | H02H 7/0851 | 318/266 |
| 4,408,146 | A * | 10/1983 | Beckerman | E05F 15/41 | 318/264 |
| 4,533,901 | A * | 8/1985 | Lederle | H02H 7/0851 | 340/425.5 |
| 4,585,981 | A | 4/1986 | Zintler | | |
| 4,625,291 | A * | 11/1986 | Hormann | E05F 15/668 | 702/41 |
| 4,686,598 | A * | 8/1987 | Herr | H02H 7/0851 | 318/285 |
| 4,707,007 | A | 11/1987 | Inoh | | |
| 4,709,196 | A * | 11/1987 | Mizuta | H02H 7/0851 | 318/467 |
| 4,736,144 | A * | 4/1988 | Chun-Pu | H02H 7/0851 | 318/264 |
| 4,746,845 | A * | 5/1988 | Mizuta | H02H 7/0851 | 318/266 |
| 4,775,178 | A | 10/1988 | Boyko | | |
| 4,796,932 | A | 1/1989 | Tame | | |
| 4,870,333 | A * | 9/1989 | Itoh | E05F 15/695 | 318/266 |
| 4,949,804 | A * | 8/1990 | Bartel | E05B 77/54 | 180/282 |
| 4,982,984 | A | 1/1991 | Yokota et al. | | |
| 5,066,056 | A | 11/1991 | Schap | | |
| 5,127,947 | A | 7/1992 | Takimoto et al. | | |
| 5,278,480 | A * | 1/1994 | Murray | H02H 7/0851 | 318/590 |
| 5,497,326 | A * | 3/1996 | Berland | H02P 7/0094 | 49/28 |
| 5,521,474 | A * | 5/1996 | Hahn | H02H 7/0851 | 318/285 |
| 5,701,063 | A * | 12/1997 | Cook | H02H 7/0851 | 318/434 |
| 5,746,459 | A | 5/1998 | Giroux, Jr. | | |
| 5,755,468 | A | 5/1998 | Buchanan, Jr. | | |
| 5,765,886 | A | 6/1998 | Buchanan, Jr. | | |
| 5,785,364 | A | 7/1998 | Kleefeldt et al. | | |
| 5,872,436 | A | 2/1999 | Bergmann et al. | | |
| 5,938,252 | A * | 8/1999 | Uemura | E05B 81/14 | 292/216 |
| 5,938,254 | A | 8/1999 | Weyerstall | | |
| 5,982,124 | A * | 11/1999 | Wang | G05B 19/4061 | 49/140 |
| 5,994,858 | A * | 11/1999 | Miura | H02H 7/0851 | 318/476 |
| 6,086,177 | A * | 7/2000 | Driendl | H02H 7/0851 | 49/28 |
| 6,127,913 | A * | 10/2000 | Niino | H01H 37/5418 | 337/377 |
| 6,167,770 | B1 | 1/2001 | Nass | | |
| 6,274,947 | B1 | 8/2001 | Terashima | | |
| 6,366,042 | B1 | 4/2002 | Gerbetz | | |
| 6,540,270 | B1 | 4/2003 | Reddmann | | |
| 6,548,974 | B2 | 4/2003 | da Silva Filgueiras | | |
| 6,573,676 | B1 * | 6/2003 | Klesing | H02H 7/0851 | 318/434 |
| 6,580,242 | B2 | 6/2003 | Hirose et al. | | |
| 6,581,990 | B1 | 6/2003 | Menke et al. | | |
| 6,597,139 | B1 * | 7/2003 | Klesing | H02H 7/0851 | 318/283 |
| 6,646,398 | B1 * | 11/2003 | Fukazawa | H02H 7/0851 | 318/264 |
| 6,659,515 | B2 * | 12/2003 | Raymond | E05B 81/20 | 292/201 |
| 6,666,487 | B2 | 12/2003 | Oxley et al. | | |
| 6,667,590 | B2 * | 12/2003 | Nagaoka | H02H 7/0851 | 318/434 |
| 6,715,808 | B2 | 4/2004 | Oxley et al. | | |
| 6,822,410 | B2 * | 11/2004 | Whinnery | G05B 19/232 | 318/266 |
| 6,867,563 | B2 | 3/2005 | Ohshima | | |
| 6,906,487 | B2 * | 6/2005 | de Frutos | H02H 7/0851 | 318/280 |
| 6,936,984 | B2 * | 8/2005 | Wilson | G05B 19/4145 | 318/264 |
| 7,014,228 | B2 | 3/2006 | Hirai | | |
| 7,015,666 | B2 | 3/2006 | Staus | | |
| 7,021,001 | B1 * | 4/2006 | Schooler | E05F 15/41 | 49/362 |
| 7,132,642 | B2 * | 11/2006 | Shank | H03K 17/955 | 250/221 |
| 7,134,241 | B2 * | 11/2006 | Suzuki | E05F 15/41 | 49/352 |
| 7,162,928 | B2 * | 1/2007 | Shank | E05F 15/46 | 73/780 |
| 7,170,244 | B2 | 1/2007 | Choby | | |
| 7,250,737 | B2 | 7/2007 | Takahashi | | |
| 7,275,774 | B2 * | 10/2007 | Oberheide | E05B 81/22 | 292/341.15 |
| 7,293,467 | B2 * | 11/2007 | Shank | B60R 21/01516 | 73/780 |
| 7,307,393 | B2 | 12/2007 | Bizard | | |
| 7,309,971 | B2 | 12/2007 | Honma et al. | | |
| 7,312,591 | B2 * | 12/2007 | Washeleski | E05F 15/697 | 318/286 |
| 7,341,292 | B2 * | 3/2008 | Brose | E05B 81/22 | 292/341.15 |
| 7,360,635 | B2 | 4/2008 | Rhodes et al. | | |
| 7,367,598 | B2 | 5/2008 | Arabia, Jr. et al. | | |
| 7,402,971 | B2 * | 7/2008 | Averitt | E05F 15/40 | 318/266 |
| 7,445,258 | B2 | 11/2008 | Rice et al. | | |
| 7,479,748 | B2 * | 1/2009 | Averitt | G05B 19/0428 | 318/434 |
| 7,489,095 | B2 | 2/2009 | Pebre | | |
| 7,568,745 | B2 | 8/2009 | Brose et al. | | |
| 7,569,999 | B2 | 8/2009 | Hayashi | | |
| 7,576,502 | B2 | 8/2009 | Pedemas et al. | | |
| 7,646,158 | B2 | 1/2010 | Suzuki et al. | | |
| 7,654,039 | B2 | 2/2010 | Heyn et al. | | |
| 7,690,152 | B2 | 4/2010 | Kobayashi et al. | | |
| 7,808,197 | B2 | 10/2010 | Kimura et al. | | |
| 7,859,204 | B2 | 12/2010 | Sakai et al. | | |
| 7,960,932 | B2 | 6/2011 | Ludwig et al. | | |
| 7,977,902 | B2 | 7/2011 | Batejat et al. | | |
| 8,104,824 | B2 | 1/2012 | Hitomi | | |
| 8,370,029 | B2 | 2/2013 | Egger et al. | | |
| 8,541,969 | B2 | 9/2013 | Holzinger et al. | | |
| 9,004,570 | B1 * | 4/2015 | Krishnan | E05B 63/0056 | 292/201 |
| 9,068,816 | B2 | 6/2015 | Grills et al. | | |
| 9,777,528 | B2 * | 10/2017 | Elie | E05F 15/41 | |
| 9,797,178 | B2 * | 10/2017 | Elie | E05F 15/77 | |
| 10,837,205 | B2 * | 11/2020 | Ishiguro | E05B 81/15 | |
| 11,215,004 | B2 * | 1/2022 | Molnar | E05F 15/616 | |

(56) References Cited

U.S. PATENT DOCUMENTS

| | | | | |
|---|---|---|---|---|
| 2002/0166288 | A1* | 11/2002 | LeGallo | E05F 11/483 49/352 |
| 2009/0145182 | A1* | 6/2009 | Bettin | E05B 81/38 292/201 |
| 2010/0314890 | A1 | 12/2010 | Hemingway et al. | |
| 2011/0252845 | A1* | 10/2011 | Webb | E05D 11/00 290/1 R |
| 2014/0173984 | A1* | 6/2014 | Schlesiger | E05F 15/75 49/506 |
| 2016/0090762 | A1 | 3/2016 | Strole et al. | |
| 2017/0026077 | A1 | 1/2017 | Nakao et al. | |
| 2017/0284134 | A1 | 10/2017 | Schwickerath et al. | |
| 2017/0302067 | A1 | 10/2017 | Bochen | |
| 2018/0051502 | A1* | 2/2018 | Roos | E05B 81/14 |
| 2018/0058128 | A1* | 3/2018 | Khan | E05F 15/42 |

FOREIGN PATENT DOCUMENTS

| | | | | | |
|---|---|---|---|---|---|
| JP | 6229156 | A | | 8/1994 | |
| WO | WO-9742384 | A1 | * | 11/1997 | E05B 81/22 |

OTHER PUBLICATIONS

"Power-Operated Window, Partition and Roof Panel Systems," Code of Federal Regulations, Title 49: Transportation, Part 571: Federal Motor Vehicle Safety Standards, Norm Standard No. 118, Revised as of Oct. 1, 2019, pp. 557-562.

"Power-Operated Window, Partition and Roof Panel Systems (Standard 118)," Canada Motor Vehicle Safety Regulations, Apr. 4, 2020, https://laws-lois.justice.gc.ca/PDF/C.R.C.,_c._1038.pdf, pp. 154-155.

Sollmann et al., "Anti Pinch Protection for Power Operated Features," SAE International: SAE technical papers, 2004, pp. 55-62.

* cited by examiner

MOTOR CONTROL FOR POWERED CLOSURE WITH ANTI-PINCH

FIELD OF INVENTION

The present invention relates to a motor control for a power striker for hinged personnel doors and windows for vehicular applications. The invention can be applied to any enclosable portal of which doors and windows are included. The terms “door” or “window” operate as an all-inclusive term when found in this specification.

BACKGROUND OF THE INVENTION

Generally power door latch systems are known within the automotive and other vehicular field and are used to overcome the high force requirements to move doors and trunks into the fully closed position. Applications range from personnel doors, trunk lids, lift gates and sliding doors on mini-vans. There generally are two types of powered door closure devices; a cinching latch where a rotary latch with a claw or rotor is driven to rotate by a motor and cinch the striker approximately 6-8 millimeters and a powered striker where the striker is motorized to engage with the rotary latch and pull the door into the fully closed position. Typically, power cinching latches are used on personnel doors including mini-van sliding doors and rear lift gates on SUV’s and mini-vans, and power cinching strikers are used on trunk lids. There are several types/styles of power strikers: Eccentric cam, linear drive—acme thread, linear drive—rack and pinion, toggle action, cam and offset lever, and combinations of the above.

Typically, a power cinching striker is activated when the rotary latch is fully engaged with the striker (primary and fully latched position); a sensor on the latch signals the door cinch mechanism to pull the door into the door closed position.

One problem with prior art cinching latches is the lack of an override system to open the door in the event that there is a power failure to the motor. If the door is closed and power to the motor is cut off, for example if the vehicle battery is dead, the door cannot be opened. Such a lockout condition is undesirable if ingress or egress is needed, potentially causing an unsafe condition.

Another problem with prior art powered strikers is the lack of any adjustment of the striker. Therefore, any variances in manufacturing due to acceptable tolerances reduces or minimizes the effectiveness of the powered striker.

Another deficiency of the prior art powered strikers is the relatively short travel that is commercially available, typically 6-8 millimeters (0.24-0.31 inch). This distance is not enough to allow large doors to engage the striker without starting to compress the door seals.

The need for such a door latch system is becoming known in the agricultural and construction industries. In tractors and cabs of heavy duty equipment, the size of the doors, the door seals, and compression of air inside the cabs are making it difficult to close the door without excessive force and speed. For example, the doors of the tractor and big equipment are becoming larger, and constructed with more glass for increased visibility. Thus, the doors have a large perimeter, while the volume of the cab is relatively small, for one or two people. As the door closes, the air in the cab compresses, thereby increasing internal air pressure. Similarly, the large door size necessitates larger seals with more surface area, which also increases the force required to close and seal the door in the door frame.

Accordingly, a primary objective of the present invention is the provision of a motorized striker for use in large vehicle doors, particularly in the agriculture and construction industries.

A further objective of the present invention is the provision of a personnel door on large vehicles having an improved door latch system with a motorized striker to simplify closing of the door.

A further objective of the present invention is the provision of a powered striker on a door latch assembly with the ability to adjust the position of the striker on the door frame so as to fine tune the closing movement of the door, as well as provide for assembly and manufacturing tolerances of the doors and cabin.

Still another objective of the present invention is the provision of a powered door striker which maintains the normal operation of the latch even in the absence of electric power to the striker, so that an operator can always open the door from inside and outside the vehicle.

Another objective of the present invention is the provision of a powered door striker having a safety feature which precludes a person from getting locked in or getting locked out of the vehicle.

Another objective of the present invention is the provision of a powered door striker having a safety feature that minimizes the likelihood of injury resulting from a jam or pinch event.

Another objective of the present invention is the provision of a motorized movable striker for a vehicle door which is economical to manufacture, easy to install, efficient, effective, and safe in operation.

These and other objectives become apparent from the following description of the invention.

SUMMARY OF THE INVENTION

A motorized moveable striker is mounted to a door post where a fixed striker would normally be mounted and provides prescribed linear movement of the striker. This movement provides extension of the door edge more specifically near the latch when the latch is engaged, such that the door can be easily shut on the striker with minimal effort and then drawn to a normally closed position where the door is compressed into the door seal fully sealing the door. In the current design, the striker moves approximately 1" between an extended position to a retracted position, but it is recognized that this dimension could be reduced or extended depending on the final application, design of the door and seals. Once the door is fully latched onto the extended striker, a switch in the rotary latch tells the control system that the latch is in place, and then the striker control system detects that the latch is in place and begins to move the striker to its retracted and sealed position. As this happens the door is drawn into its normally closed position which engages the seal with the frame and the door becomes sealed as it moves to its normally closed position. Upon releasing the latch through a releasing mechanism, the switch in the rotary latch tells the controller that the latch has been removed from the striker, and then the striker control system detects that the latch has been removed from the striker and the control extends the striker to approximately 1" outward of the retracted position. This prescribed outboard movement moves the striker into extended position which allows for the next latching event. This motorized moveable striker system will lessen the events where a door is only partially engaged because it offers a closing event that is not impeded by door seal or air compression. This is accomplished as the door engages the door seal as the striker moves to the retracted closed position after the latch has been engaged with the striker.

The motorized movable or cinching striker for vehicle doors, according to the present invention has numerous beneficial features, including but not limited to the following.

The motorized moveable striker is mounted to a door post where a rotary latch striker would normally be mounted and provides prescribed linear movement of the striker. This movement provides movement of the door edge near the latch when the latch is engaged, such that the door can be easily shut on the striker with minimal effort and then drawn to a position where the seal load is increased to seal the door. This motorized moveable striker system will lessen the events where a door is only partially engaged because it offers a closing event that is not impeded by seal or air compression, as the striker engages the door seal by moving the door to a retracted position The striker moves from its retracted position to an extended position approximately 1" outboard of the vehicle centerline. Once the door is latched onto the striker, the striker control system verifies that the latch is in the primary latching position and begins to move the striker to its intended retracted position. As this happens the door is drawn into its normal closed position, and the seal is engaged with the frame and the door becomes sealed.

Upon releasing the latch, the striker control system senses that the latch has been removed from the striker and the control again moves the striker to approximately 1" outward of the retracted position for the next latching event.

In order to be able to facilitate adjustment, an adjustable link is in place to link the motor to the moveable striker carrier. This will allow for inboard and outboard adjustment of the striker in both the extended and retracted positions.

When the striker is at its most inboard and outboard positions, the pivot rivet, torque wheel drive pin, and motor drive shaft are directly in line. This allows for the mechanism to be very strong in the fact that any inboard or outboard forces on the mechanism do not translate into rotational energy for the motor to resist.

The whole mechanism is scalable and can be scaled up and down for larger and smaller size doors. This allows for this technology to cross several types of doors from compartment to occupant.

The power for the striker is independent from any latching device, and should there be a power failure the door would still be operable and able to be latched or unlatched, no matter the state of the striker. This independence accommodates concerns over a mechanism failing in the closed and retracted position and keeping an occupant from egressing a vehicle as well as always being able to have the door secured onto the striker.

The powered striker allows latches to be kept simple and allows adjustment of the mounting fasteners based on the striker mount to facilitate tolerance adjustment or control the amount to door seal compression. Thus, the powered striker is more simply able to retrofit to existing applications, by just adjusting the mounting plate for the cinching striker.

The integration of the mechanical and electromechanical systems into the latch and the motorized movable striker, allows the electronic controller to know the status of the door latch at all times.

The integration of an external switch into the latch senses the door being fully latched in the primary position on the striker, and signals the controller to actuate and retract the striker. Conversely the same latch switch can tell the controller if the latch is disengaged and to extend the striker.

Safety is considered by using switch/bump strips at the door edge, which can be integrated into the controller to reverse the power and move the striker back to an extended direction to remove an obstruction.

Safety reversing can also be done in different fashions. For example, a stepper style motor has a known signal wave, and compares a closing event to the normal signal, and compare these waves, with any deviation signaling an obstruction to the controller and reverse the compression to extend the striker again. Another method is to establish a high amperage level that can be detected by the controller that is caused from an obstruction around the door perimeter, that would stop and reverse the motor, thereby extending the striker.

This powered striker assembly is attached to the door post, which keeps the assembly in an area that is not obstructing a critical line of sight. The striker takes up space that is already taken up by the cab rollover protection system (ROPS), and eliminates having to take up additional area on the door glass for the latch. Since the moveable parts are built into the powered striker assembly, which is mounted to the ROPS, additional latch parts which take up additional space into the latch are eliminated. Thus, this striker mechanism adds function to a cab without detracting from valuable visibility for the operator.

The cinching striker mechanism carries provisions for strength in all the normal FMVSS loading orientations. By capturing a pair of rivets in slots, FMVSS 206 safety standard static loading is achieved with this moveable mechanism. These rivets and slots achieve both longitudinal and transverse loading goals as set by FMVSS 206 safety standards.

The design and flexibility of this moveable striker mechanism also allows for future expansion of function, such as the flexibility to add a gear box to the back of the mechanism which would allow remote drive of the striker mechanism by a cable or rod drive. This allows for remote location of the drive motor to eliminate packaging concerns near the striker position on the roll over protection structure (ROPS).

Utilizing a gear box drive adds the ability of this striker mechanism to be driven remotely, which in turn allows use of one drive motor with two output points to drive two cinching striker mechanisms. This would allow placement of two movable striker mechanisms on larger doors where the mechanisms are driven by one drive motor and they are located at the top and bottom of a larger area door to draw multiple points of the door closed.

Utilizing a moveable pivoting cinching mechanism means that this does not have to be limited to moving a striker. With the moveable plate cinching technology, the moveable plate can be placed on the door glass or door frame and the latch can be placed on the moveable plate. This would allow all power mechanisms in the door so that power/wire routing all has to be in one area, and then the moveable mechanism can cinch the door by moving the latch on the door glass instead of moving the striker itself. This could be a cost competitive option due to power/wire routing and going back to a simple striker on the ROPS post.

Motor selection and torque wheel sizing can drive many aspects regarding performance of the cinching mechanism. For example, the torque wheel pivot to pin distance can change the overall cinch distance regarding the known 1" pull travel requirement. The other factor is the RPM of the motor and the speed at which the mechanism pulls the cinch distance and the time in which it travels this distance. These two factors linked together control the amount of force output. It is noted that speed, distance, and time are all interrelated and affect each other in the performance of the power striker mechanism. Common commodity motors can have a certain RPM output and given output torque, such that the torque wheel design can then be designed such that the outputs of the cinch mechanism meet customer requirement based on a specific motor output.

DETAILED DESCRIPTION OF THE INVENTION

Figure 1:
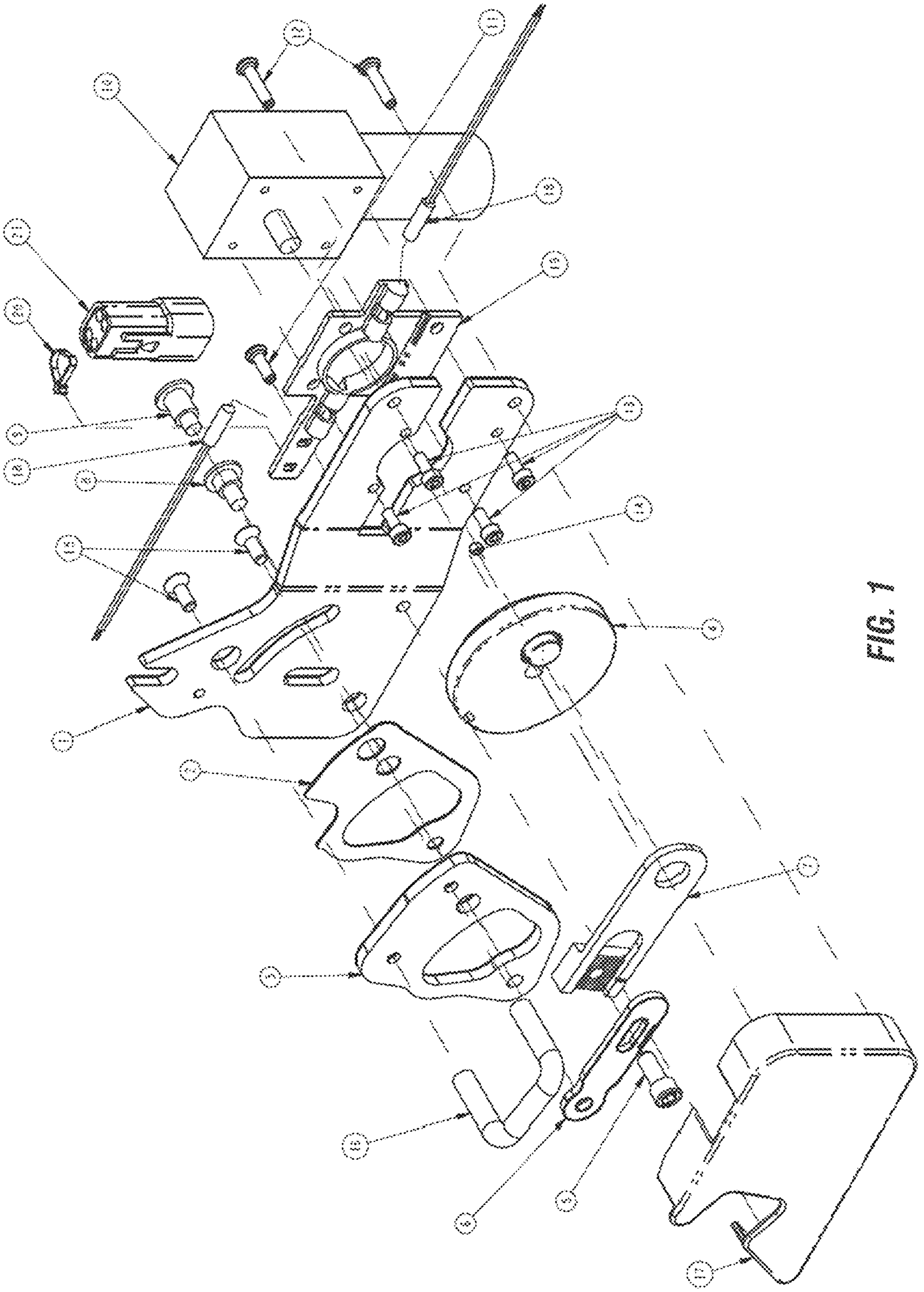
FIG. 1 is a perspective exploded view of the overall assembly with a hoop striker, with a first embodiment of the pivot plate, mount plate and drive motor.

The following part list describes the components and their functions, using reference numerals corresponding to the drawings.

Figure 2:
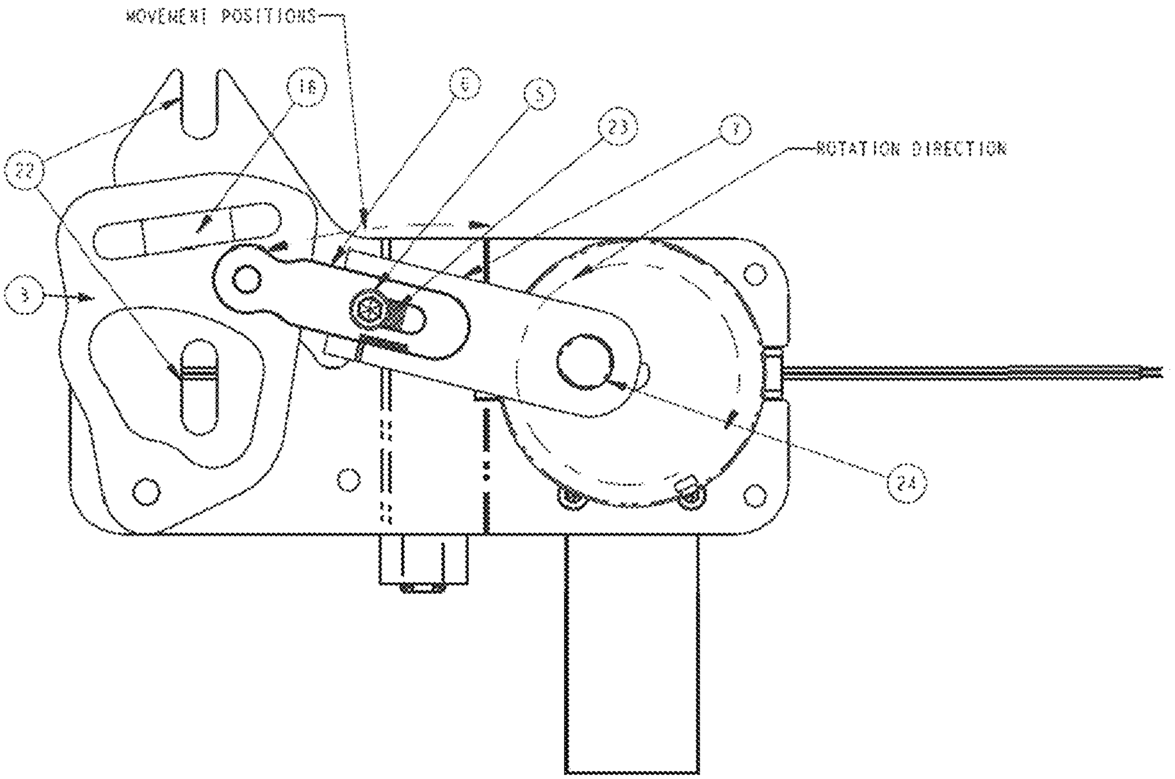
FIG. 2 is a front plan view of the cinching door mechanism with cover hidden.

1. Mount plate—provides mounting surfaces for all cinching mechanism parts and provides mounting and mounting adjustment details for mounting to the vehicle.
2. Glide—isolates the moveable pivot plate 3 from the mounting plate 1 to reduce friction and wear.
3. Pivot Plate—provides a base with a mounting surface for moveable apparatus, also has a pivot rivet mounting hole 67, and a pivot plate drive hole 58.
4. Torque Wheel—houses a magnet 14 for positional sensing, provides a drive feature for the motor interface, and a drive feature for a link that connects the torque wheel to the pivot plate 3.
5. Link Adjustment Screw—provides positive retention between the adjustable link components.
6. Driven Link—attaches to the pivot plate 3 via the drive rivet 9 and interfaces with the drive link 7 through the link adjustment screw 5.
7. Drive Link—attaches to the torque wheel 4 via the torque wheel drive pin 24 and interfaces with the driven link 6 through the link adjustment screw 5.
8. Pivot Rivet—retains the pivot plate 3 and the glide 2 to the mount plate 1, and allows the pivot plate 3 and the glide 2 to pivot via the pivot rivet pivot shoulder 59.
9. Drive Rivet—retains the driven link 6 to the pivot plate 3, drives the pivot plate 3 and glide 2 on through the drive rivet guide shoulder 60, and retains surface contact between the pivot plate 3, the glide 2 and the mount plate 1 through the pivot rivet retention head 62.
10. Drive Motor—provides rotational motion and torque to the torque wheel 4 to drive the mechanism. The motor is electric, and preferably rotates 360, though a reversible motor can also be used.
11. Cover Screw—retains the cover 17 to the mount plate 1.
12. Cover Screw—retains the cover 17 to the mount plate 1.
13. Motor Mount Screw—retains the sensor retention plate 19 and the drive motor 10 to the mount plate 1.
14. Magnet—provides a magnetic field to be sensed by the extended/retracted position sensor.
15. Striker mount screw—retains the striker apparatus 16 to the pivot plate 3.
16. Hoop Striker—provides a latch retention surface for latching the occupant door.
17. Cover—covers all moveable part and retains the drive link 7 and the torque wheel 4 and maintains their contact.
18. Extended/Retracted Position Sensor—provides positional feedback by sensing the magnet 14 and opening or closing a circuit internal to itself that a cinching striker controller input can verify.
19. Sensor Retention Plate—provides for positive positional placement of the extended/retracted sensor 18, provides wire routing features, and location for a wire retaining zip tie 20 to be secured.
20. Wire Retaining Zip Tie—used to retain the wires and the connector 21 to the sensor retention plate 19.
21. Wire Connector—used to connect the cinching door mechanism electrically to a cinching door mechanism controller, receives wiring from the drive motor 10 and the extended sensor 28 and the retracted sensor 27. (FIGS. 1 and 3.)
22. Vertical adjustment slots—on the mount plate 1 and allows for the cinching door mechanism to be adjusted vertically on a vehicle mounting location. (FIG. 2)

23. Extension/Retraction adjustment slot—in the driven link 6 and allows a place for the link adjustment screw to pass through and provides adjustment limits. (FIG. 2)

Figure 4:
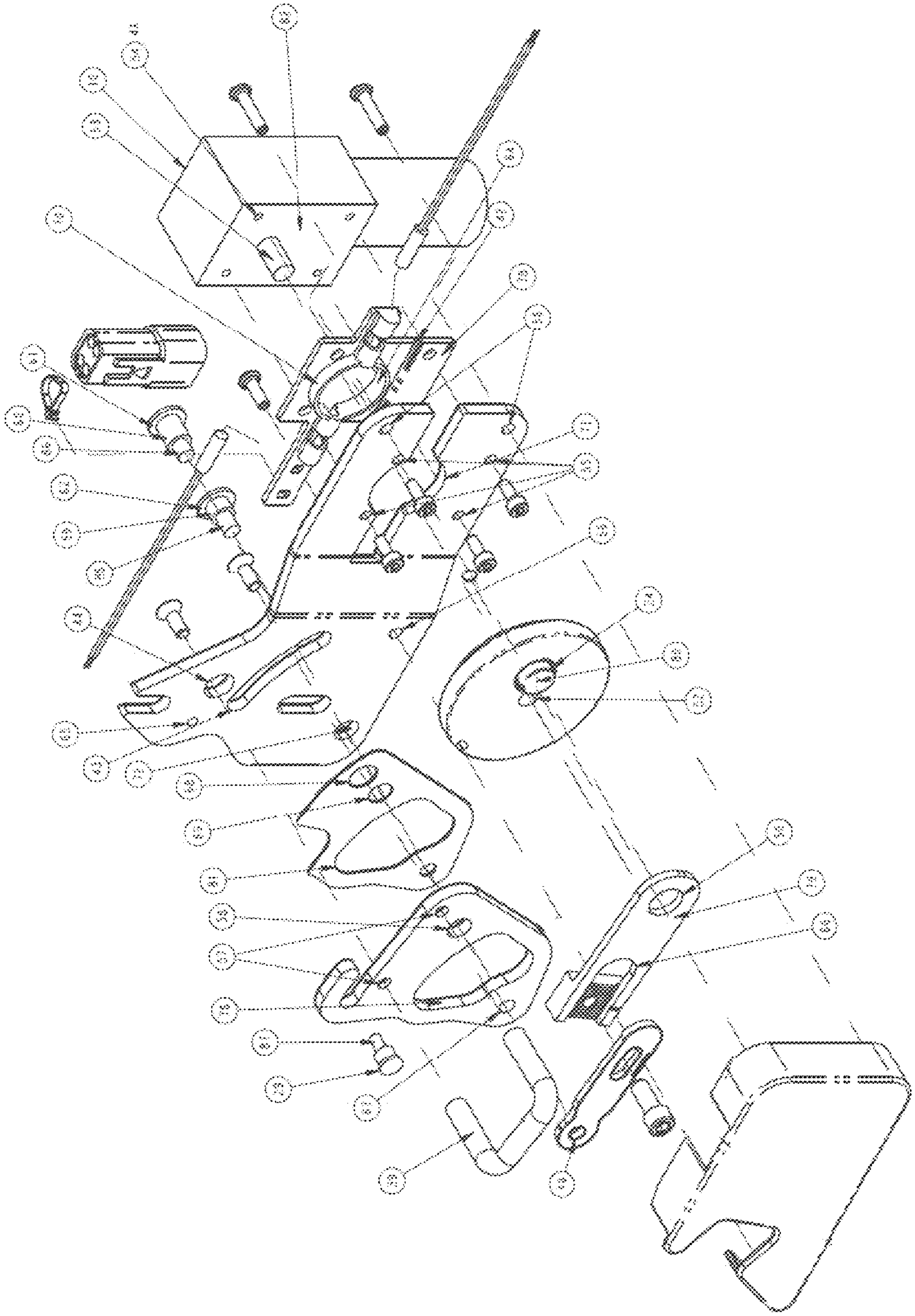
FIG. 4 is a perspective exploded view of the overall assembly with the hoop striker and longitudinal loading rivet with an alternative pivot plate.

24. Torque wheel drive pin—mates with the drive link drive hole 50 to provide a place for an interface to the drive link 7 and the torque wheel 4 (FIG. 4).

Figure 3:
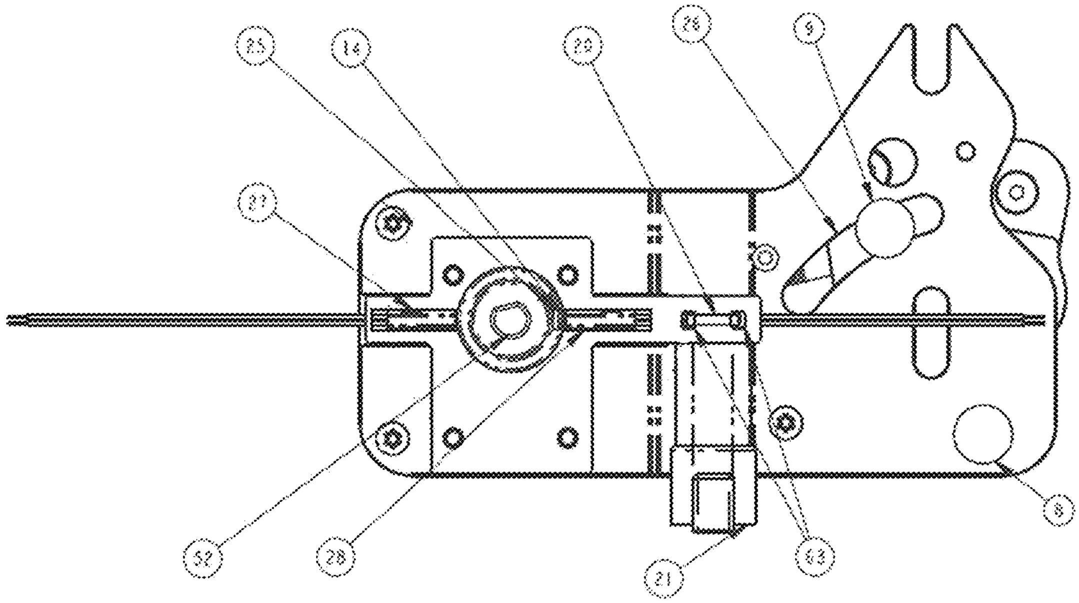
FIG. 3 is a rear plan view of the cinching door mechanism with motor hidden.

25. Magnet pocket—provides a place for the magnet 14 to be attached to the torque wheel 4 (FIG. 3).

26. Arcuate Drive Rivet Slot—in the mount plate 1 to provide sliding guide for the drive rivet 9 to pass through the mount plate 1, thus allowing the drive rivet head to be on the back side of the mount plate 1 so as to retain the pivot plate 3 and the glide 2 to the mount plate 1 (FIG. 3).

27. Retracted Sensor Position—senses the magnet 14 to tell the cinching door mechanism controller to stop motion that mechanism is retracted (FIG. 3).

28. Extended Sensor Position—senses the magnet 14 to tell the cinching door mechanism controller to stop motion that mechanism is extended (FIG. 3).

29. Longitudinal loading rivet—retains an upper part of the pivot plate 3 to the mount plate 1 when longitudinal load is placed on the striker device 16, 35.

30. Longitudinal loading slot—in the pivot plate 3 to provide a place for interface of the pivot plate 3 to the longitudinal loading rivet 29.

31. Lower vertical adjustment slot—one of the slots 22 in the mount plate 1 to provide interface for the mounting fastener, and to allow for vertical adjustment of the cinching mechanism.

32. Upper vertical adjustment slot—one of the slots 22 in the mount plate 1, to provide interface for mounting the fastener, and to allow for vertical adjustment of the cinching mechanism.

Link adjustment indicators—on the drive link 7 to provide finite adjustment indicators for the driven link 6.

Link adjustment mark—on the drive link 7 to provide a finite adjustment indication alignment mark for the drive link 7.

35. Striker bolt—alternative striker interface that can be mounted on the pivot plate 1 in place of a hoop striker 16.

Figure 6:
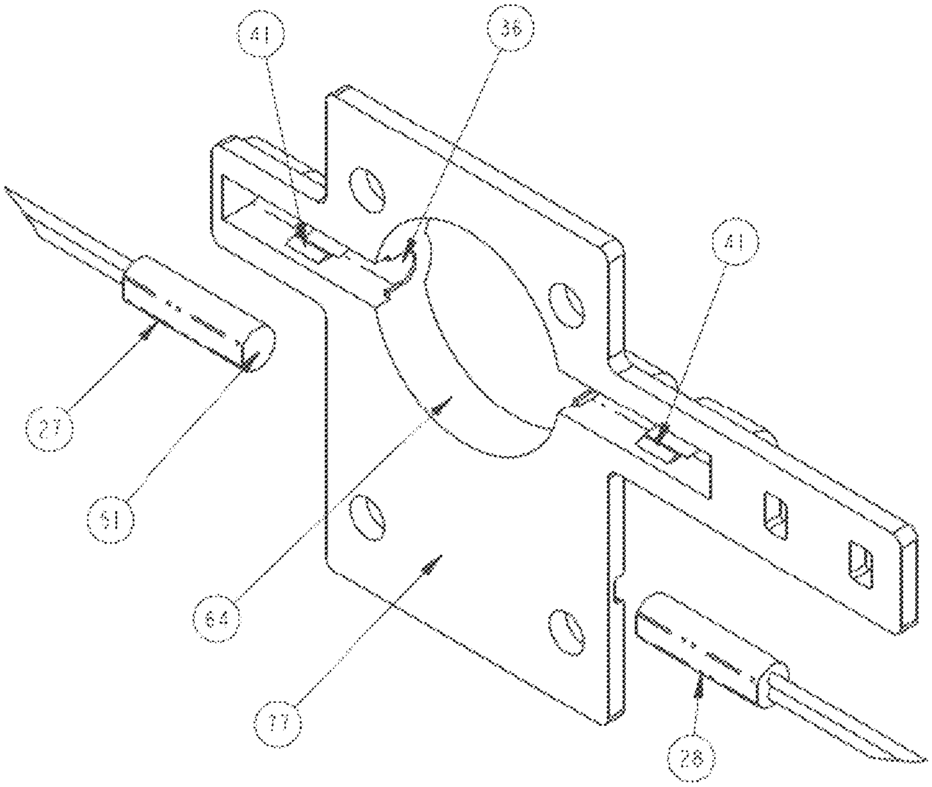
FIG. 6 is a detail view of FIG. 5 showing details of the sensor retention plate and extended/retracted sensors.
Figure 7:
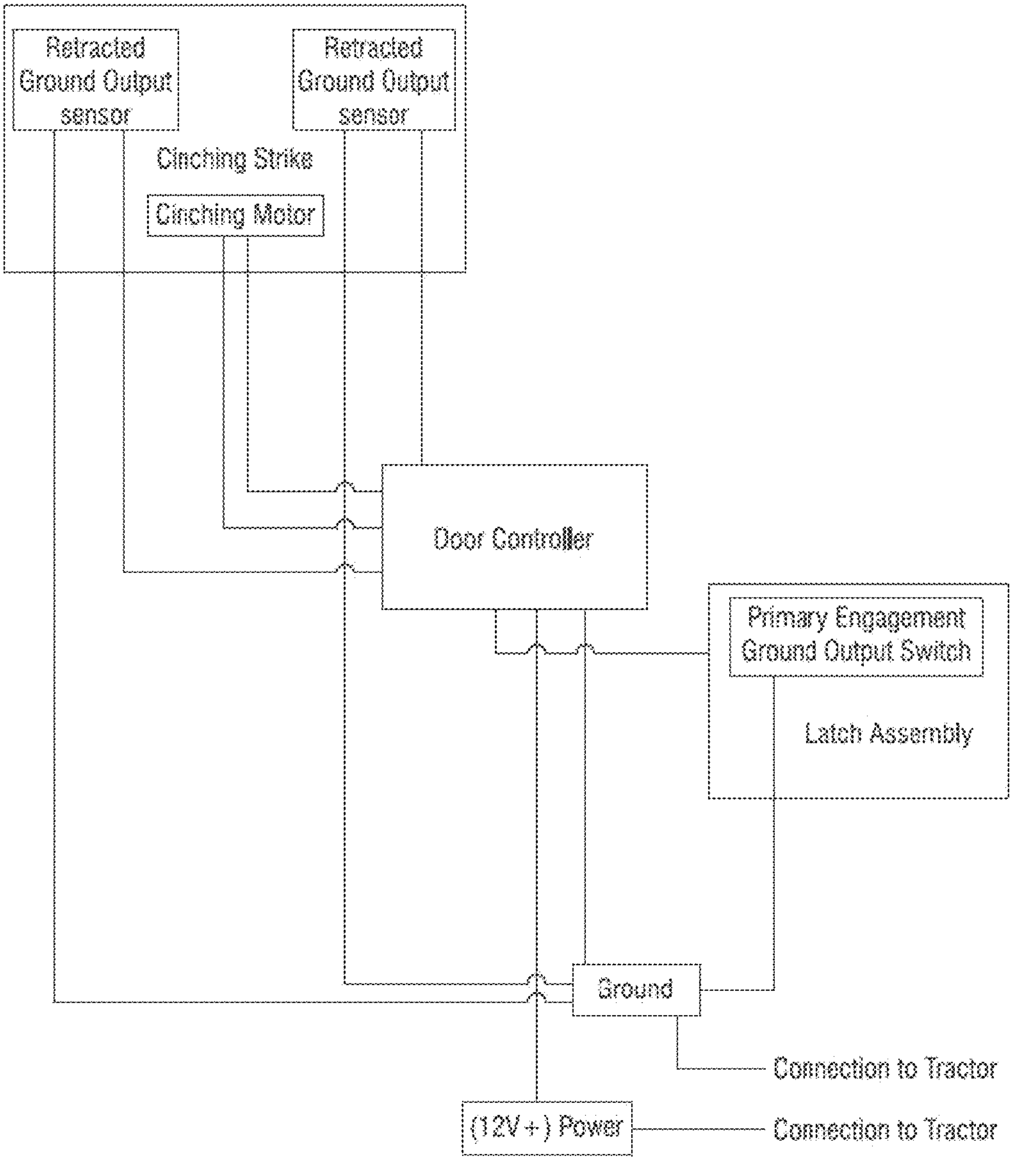
FIG. 7 is a schematic view of the striker and the latch assembly controller.

36. Sensor retention plate pocket—U-shaped channel in the sensor retention plate 19 that accepts the extended sensor 28 and retracted sensor 27. (FIG. 6.)

Figure 5:
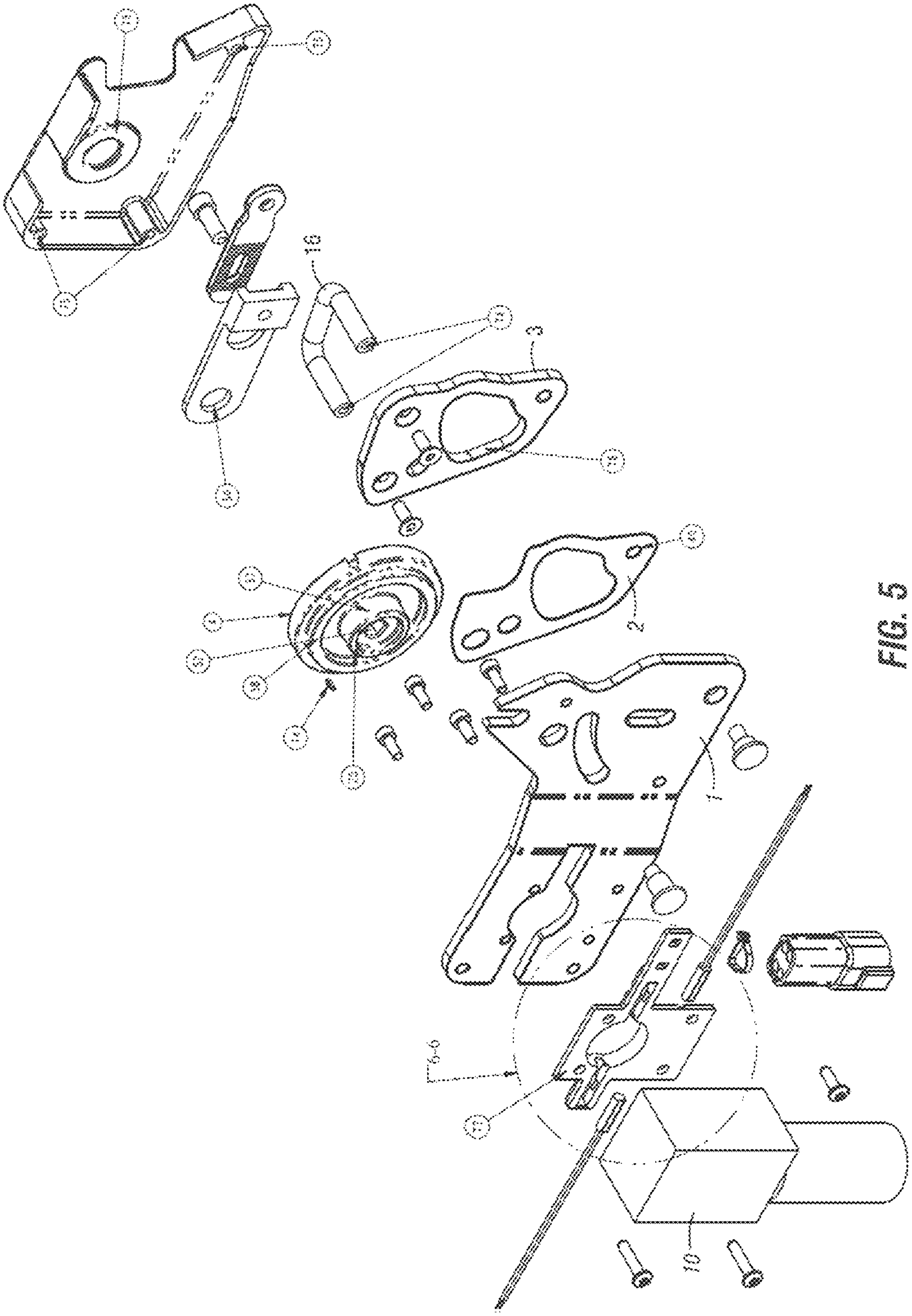
FIG. 5 is a rear perspective exploded view of the overall assembly with the hoop striker attached to the pivot plate.

37. Torque wheel pivot guide shaft—provides a bearing surface for torque wheel 4 to rotate about and takes side loading. (FIG. 5.)

38. Torque wheel bearing surface—provides a bearing surface for the torque wheel 4 to rest against the mount plate 1. (FIG. 5.)

39. Hoop striker latch retention surface—location where latching the device attaches the door to the cinching door mechanism. (FIG. 4.)

40. Pivot rivet mounting hole—pivot hole in the glide 2 that the glide pivots about, and maintains the relationship between the pivot plate 3 and the mount plate 1. (FIG. 5.)

41. Sensor retention barb—protrusion in the sensor retention plate sensor pocket 36 that retains the extended sensor 28 and the retracted sensor 27. (FIG. 6.)

42. Wire routing path—channel created under the sensor retention plate 19 for wire routing. (FIG. 4.)

43. Drive rivet retention slot—slot that controls the drive rivet 9 and allows for the drive rivet 9 to move the pivot plate 3 on the mount plate 1. (FIG. 4.)

44. Striker mount screw access hole—allows for access to the striker mount screw 15 through the mount plate 1. (FIG. 4.)

Wire routing path—path between the wire retaining zip tie 20 and the sensor retention plate 19.

Driven link adjustment retention feature—provides a tooth featured surface on the driven link that locks the driven link 6 to the drive link 6 when the link 7 adjustment screw 5 is tightened.

Drive link adjustment retention feature—provides a tooth featured surface that locks the driven link 6 to the drive link 7 when the link adjustment screw 5 is tightened.

Link adjustment screw mounting hole—threaded hole in the drive link 7 that receives the link adjustment screw 5 and allows the link adjustment screw 5 to be threaded into the drive link 7.

49. Driven link mounting hole—receives the drive rivet 9 to retain and drive the pivot plate 3 and the glide 2 through the drive rivet retention slot 43. (FIG. 4.)

50. Drive link drive hole—receives the torque wheel drive pin 24 on the torque wheel 4 which allows the torque wheel 4 to drive the drive link 7. (FIG. 4.)

51. Sensor Face—Face of the extended/retracted sensor 18 that is oriented near the magnet 14 to sense the magnetic field. (FIG. 6.)

52. Torque wheel center drive—receives the motor drive shaft 53 to transfer rotation and torque to the torque wheel 4. (FIG. 5.)

53. Motor drive shaft—transfers rotation and torque from the drive motor 10 to the torque wheel 4 to drive the cinching door mechanism. (FIG. 4.)

54. Motor mounting holes—threaded holes that allow for the motor mount screw 13 to be threaded into the motor 10. (FIG. 4.)

55. Motor mounting holes—clearance hole in the mount plate 1 that allow for the motor mount screw 13 to pass through and align the drive motor 10 to the mount plate 1, also retains the drive motor 10 so it can pass rotation and torque to the torque wheel 4. (FIG. 4.)

56. Cover mounting holes—holes in the mount plate 1 that accept the cover screw 11, 12. (FIG. 4.)

57. Striker mounting holes—holes in the pivot plate 3 that allow the striker mount screw 15 to pass through and attach the striker apparatus 16, 35. (FIG. 4.)

58. Pivot plate drive hole—accepts the drive rivet 9, and more specifically, the drive rivet guide shoulder 60 and drives the pivot plate 3. (FIG. 4.)

59. Pivot rivet pivot shoulder—fits into the pivot rivet pivot hole 72 and allows rotational motion between the mount plate 1, the pivot plate 3, and the glide 2. (FIG. 4.)

60. Drive rivet guide shoulder—fits into drive rivet retention slot 43 to control movement of the pivot plate 3 and the glide 2, and passes through the drive rivet retention slot 43, the glide rivet drive hole 69, and the pivot plate drive hole 58. (FIG. 4.)

61. Drive rivet retention head—maintains contact with the mount plate surface to retain contact of the mount plate 1, the glide 2, and the pivot plate 3. (FIG. 4.)

62. Pivot rivet retention head—maintains contact with the mount plate surface to retain contact of the mount plate 1, the glide 2, and the pivot plate 3. (FIG. 4.)

63. Wire routing retention zip tie mounting holes—access holes in the sensor retention plate 19 that allow the wire retaining zip tie 20 to be looped through to retain wires. (FIG. 3.)

64. Torque wheel pivot guide bore—accepts the torque wheel pivot guide shaft 37 to provide a bearing surface for side load of the torque wheel 4. (FIG. 6.)
65. Longitudinal load rivet mounting hole—accepts the longitudinal loading rivet mount shoulder 87 to fasten the longitudinal loading rivet 29 to the mount plate 1. (FIG. 4.)
66. Driven link guide slot—provides for perimeter support of the driven link 6 so that the driven link 6 is not allowed to rotate about the link adjustment screw 5. (FIG. 4.)
67. Pivot rivet mounting hole—accepts the pivot rivet mount shoulder 85 and affixes the pivot rivet 8 to the pivot plate 3. (FIG. 4.)
68. Striker mount screw access hole—allows for access to the striker mount screw 15 through the glide 2. (FIG. 4.)
69. Glide rivet drive hole—accepts the drive rivet 9, and more specifically the drive rivet guide shoulder 66 and drives the glide 2. (FIG. 4.)
70. Sensor retention plate collar—fits into the mount plate sensor retention plate bore 71 to locate the sensor retention plate 19 and transfer bearing load from the torque wheel 4 through the torque wheel pivot guide shaft 37 and the torque wheel pivot guide bore 64. (FIG. 4.)
71. Mount plate sensor retention plate bore—accepts the sensor retention plate collar 70 to locate the sensor retention plate 19 and transfer bearing load from the torque wheel 4 through the torque wheel pivot guide shaft 37 and the torque wheel pivot guide bore 64. (FIG. 4.)
72. Pivot rivet pivot hole—accepts the pivot rivet pivot shoulder 59 to allow rotational movement between the mount plate 1, the glide 2, and the pivot plate 3. (FIG. 4.)
73. Cover hold down surface—holds the torque wheel 4 and drive link 7 in place by maintaining contact with the drive pin hold down surface 80 and the drive link hold down surface 79. (FIG. 5.)
74. Hoop striker mounting hole—accepts the striker mount screw 15 to attach the hoop striker 6 to the pivot plate 3. (FIG. 5.)
75. Cover screw mounting holes—accepts the cover screws 11, 12 to attach the cover 17 to the mount plate 1. (FIG. 5.)
76. Pivot plate clearance cutout—allows for cinching door mechanism mount screw to stand proud of the mount plate 1 and not interfere with the pivot plate 3 movement. (FIGS. 4 and 5.)
77. Rear sensor retention plate motor mounting surface—provides a bearing clamp surface for the motor mounting surface 82 to mount the drive motor 10 against. (FIG. 6.)
78. Front sensor retention plate mounting surface—provides a bearing clamp surface for the sensor retention plate 19 to mount to the mount plate 1. (FIG. 4.)
79. Drive link hold down surface—maintains contact with the cover hold down surface 73 to hold the drive link 7 in place. (FIG. 4.)
80. Drive pin hold down surface—maintains contact with the cover hold down surface 73 to hold the torque wheel 4 in place. (FIG. 4.)
81. Glide clearance cutout—allows for cinching door mechanism mount screw to stand proud of the mount plate 1 and not interfere with the glide 2 movement. (FIG. 4.)
82. Motor mounting surface—provides a bearing clamp surface for the sensor retention plate 19 to mount to the motor 10. (FIG. 4.)

Striker bolt latch retention surface—a location where the latching device attaches the door to the cinching door mechanism.

Latch—latching mechanism which interfaces with the hoop striker latch retention surface 39 to hold the door in place with respect to the hoop striker 16 and the pivot plate 3 movement.

85. Pivot rivet mount shoulder—Fits into the pivot rivet mounting hole 67 to locate and retain the pivot plate 3 and the glide 2 to the mount plate 1. (FIG. 4.)
86. Drive rivet mount shoulder—Fits into the driven link mounting hole 49 to locate and maintain the pivot plate 3, the glide 2, and the mount plate 1 contact, and to drive the pivot plate 3 and the glide 2. (FIG. 4.)
87. Longitudinal loading rivet mount shoulder—Fits into the longitudinal load rivet mounting hole 65 to retain the longitudinal loading rivet 29 to the mount plate 1. (FIG. 23.)
88. Latch switch—provides feedback to the controller that the latch is in the primary and fully latched position and in the unlatched and fully open position.
100. Controller
102. Motor Assembly-draws/retracts the door or window
104. Door Latch-engages/interacts with the striker
106. Striker-engages/interacts with the door latch In operation, the striker of the embodiment shown in FIGS. 1-7 is in an extended position when the door is open and the latch is disengaged or open. When the door is closed, the latch engages the striker, which is detected by the switch, which in turn sends a signal to the controller to actuate the motor. The motor rotates the torque wheel, which in turn moves the drive link and driven link, so as to pivot the pivot plate and thereby retract the striker approximately 1". This retraction movement of the striker pulls the door tight to provide an enhanced seal between the door and the door frame. When the latch is released or disengaged from the striker by operation of the interior or exterior door handle to open the door, the switch in the rotary latch sends a signal to the controller to actuate the motor, which in turn rotates the torque wheel which moves the drive link and driven link, so as to pivot the pivot plate and thereby extend the striker approximately 1", in preparation for the next closing of the door.

The torque wheel can be rotated 360 by the motor, or in the case of a reciprocating motor the torque wheel is oscillated 180, so as to extend and retract the striker.

The distance that the striker is moved by the motor can be adjusted or fine-tuned by changing the extent of overlap between the drive link 7 and the driven link 6. The links 6, 7 have overlapping teeth 46, 47 to secure the links in a desired position via the link adjustment screw 5.

The motor 10 is connected to a power supply of the vehicle independently of the rotary latch. Therefore, in case of a power failure, the latch can still be operated in a normal manner to open and close the vehicle door. Thus, a person cannot be locked in or locked out of the vehicle due to a lack of power to the motor, such as a dead battery.

Figure 8:
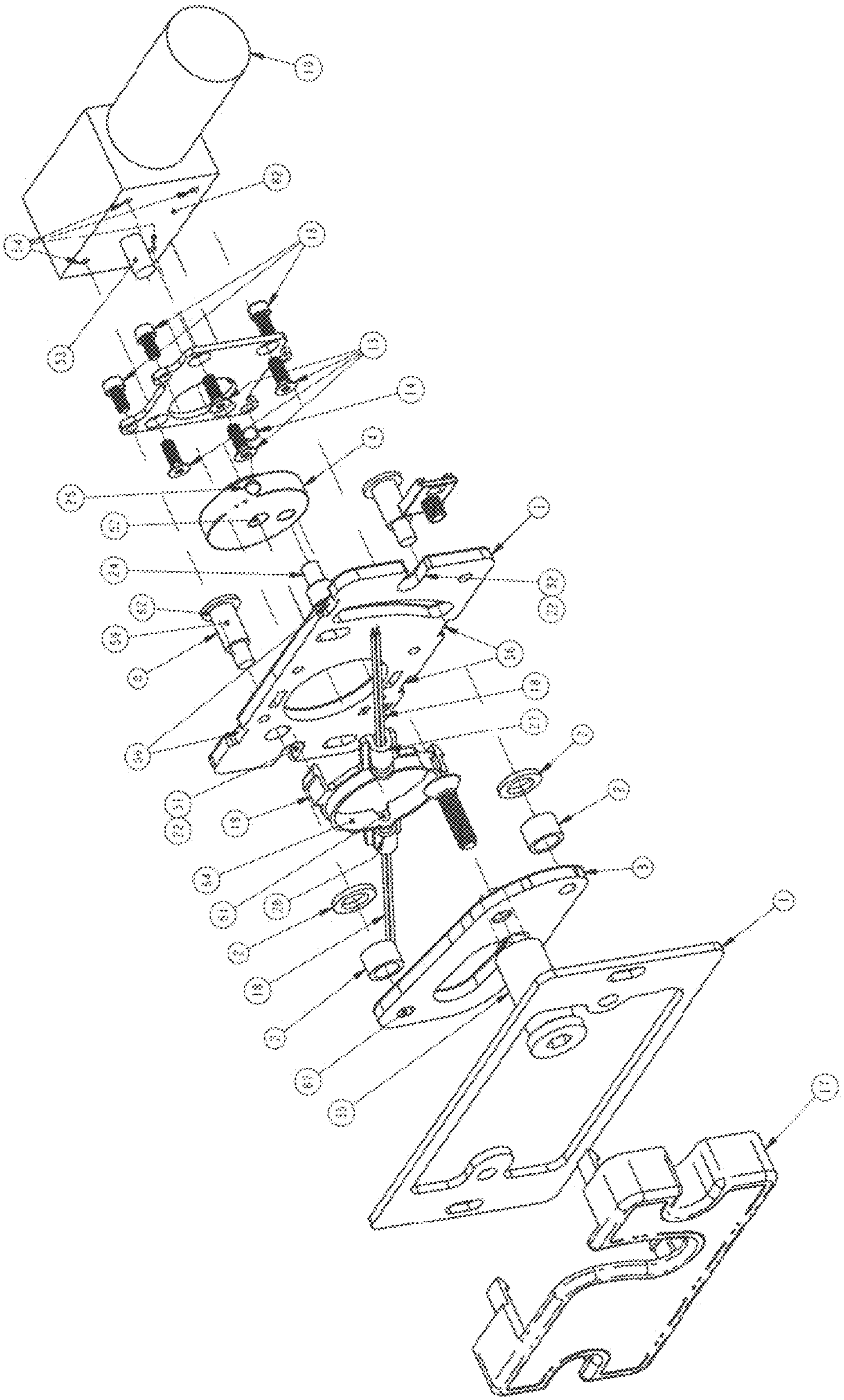
FIG. 8 is a front perspective of an alternative embodiment that has motor directly placed under the mechanical assembly with striker bolt shown in retracted position, shown exploded.
Figure 9:
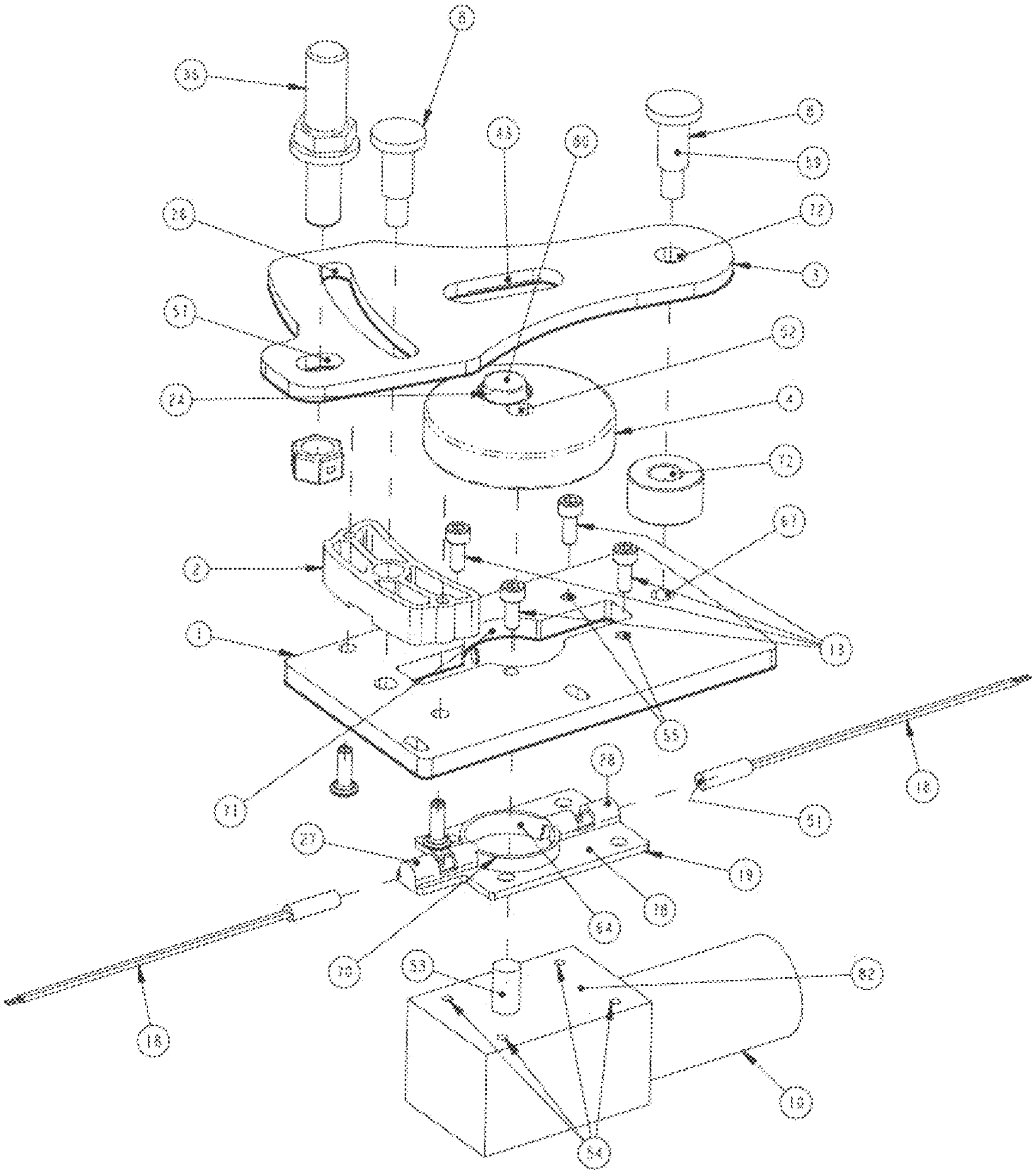
FIG. 9 is a perspective exploded view of an alternative embodiment shown with the striker in retracted position.
Figure 10:
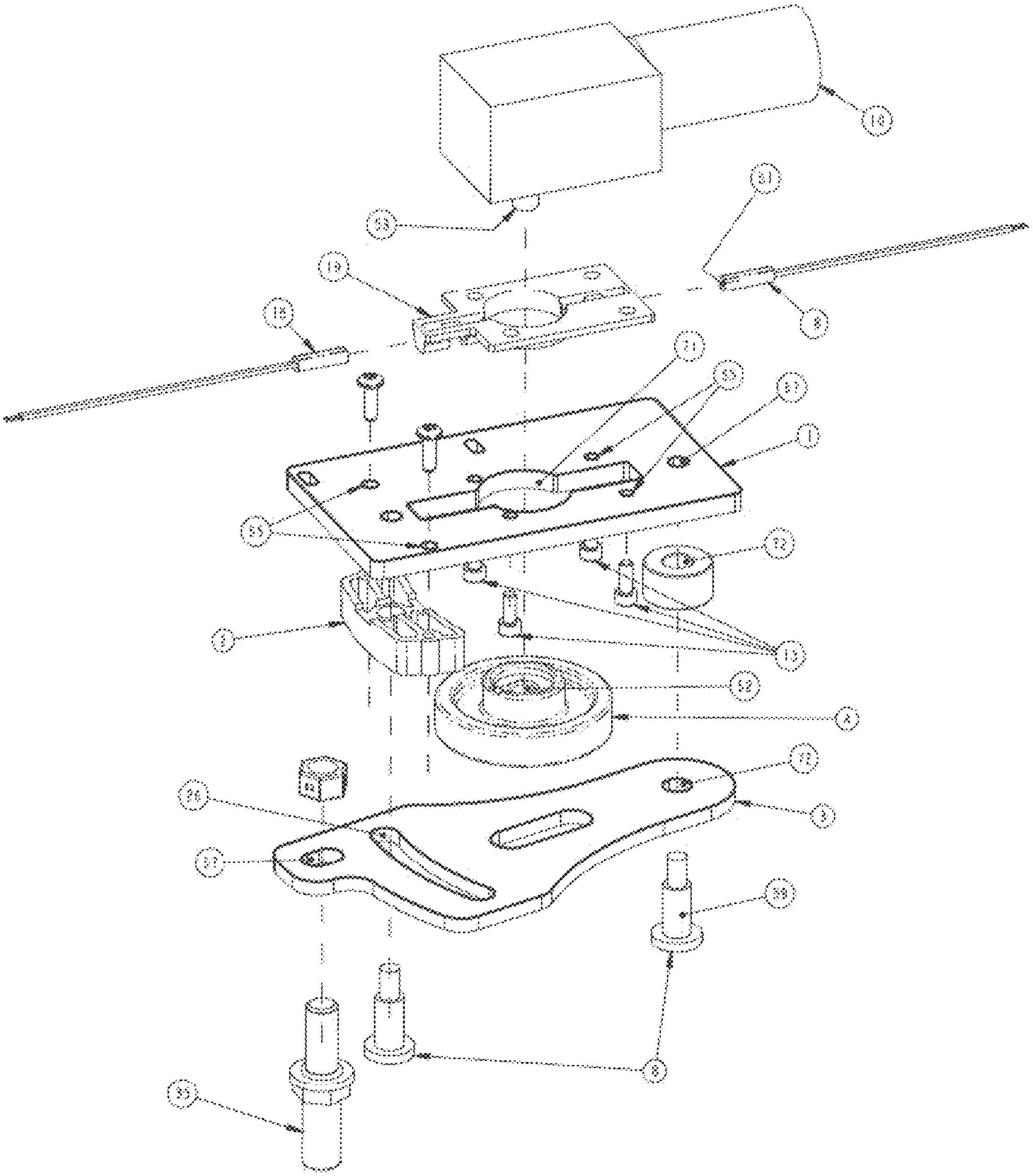
FIG. 10 is another perspective exploded view of the embodiment shown in FIG. 9.
Figure 11:
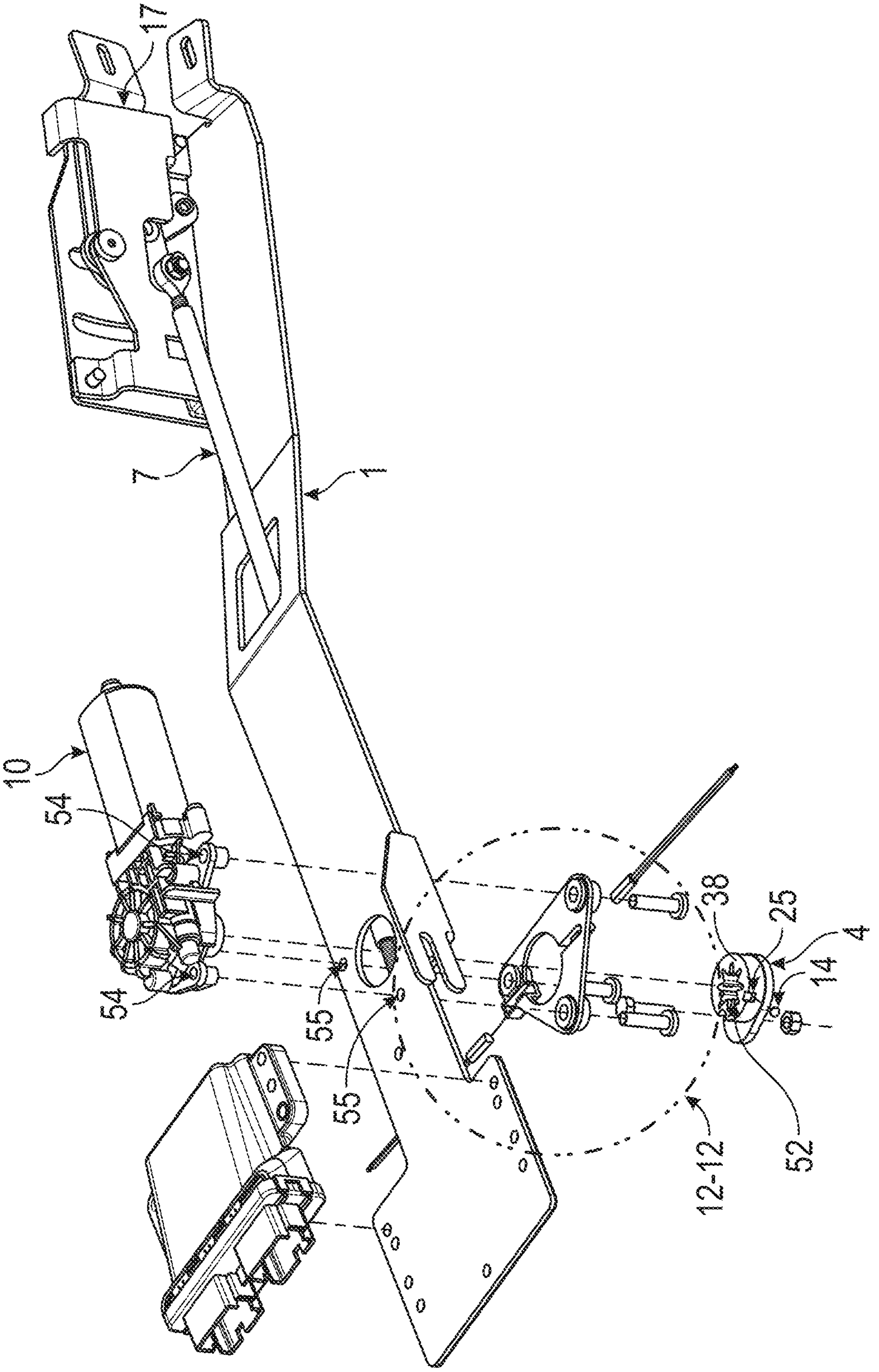
FIG. 11 is an exploded perspective of an alternative embodiment of a self-contained assembly module with a remote drive motor and controller.
Figure 12:
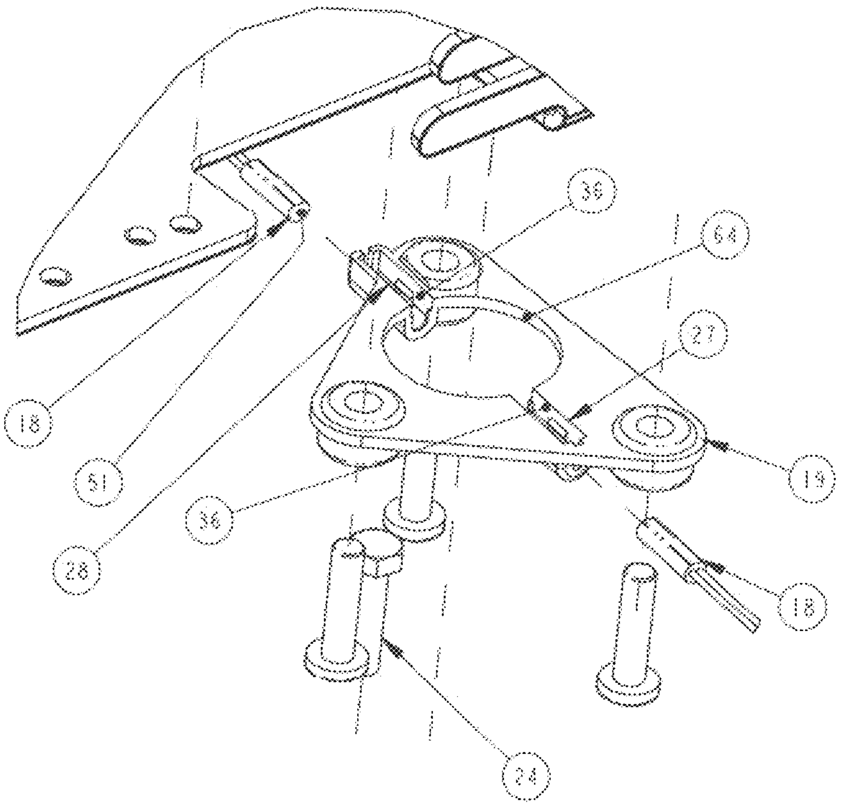
FIG. 12 is an enlarged view taken along line 12.12 of FIG. 11.
Figure 13:
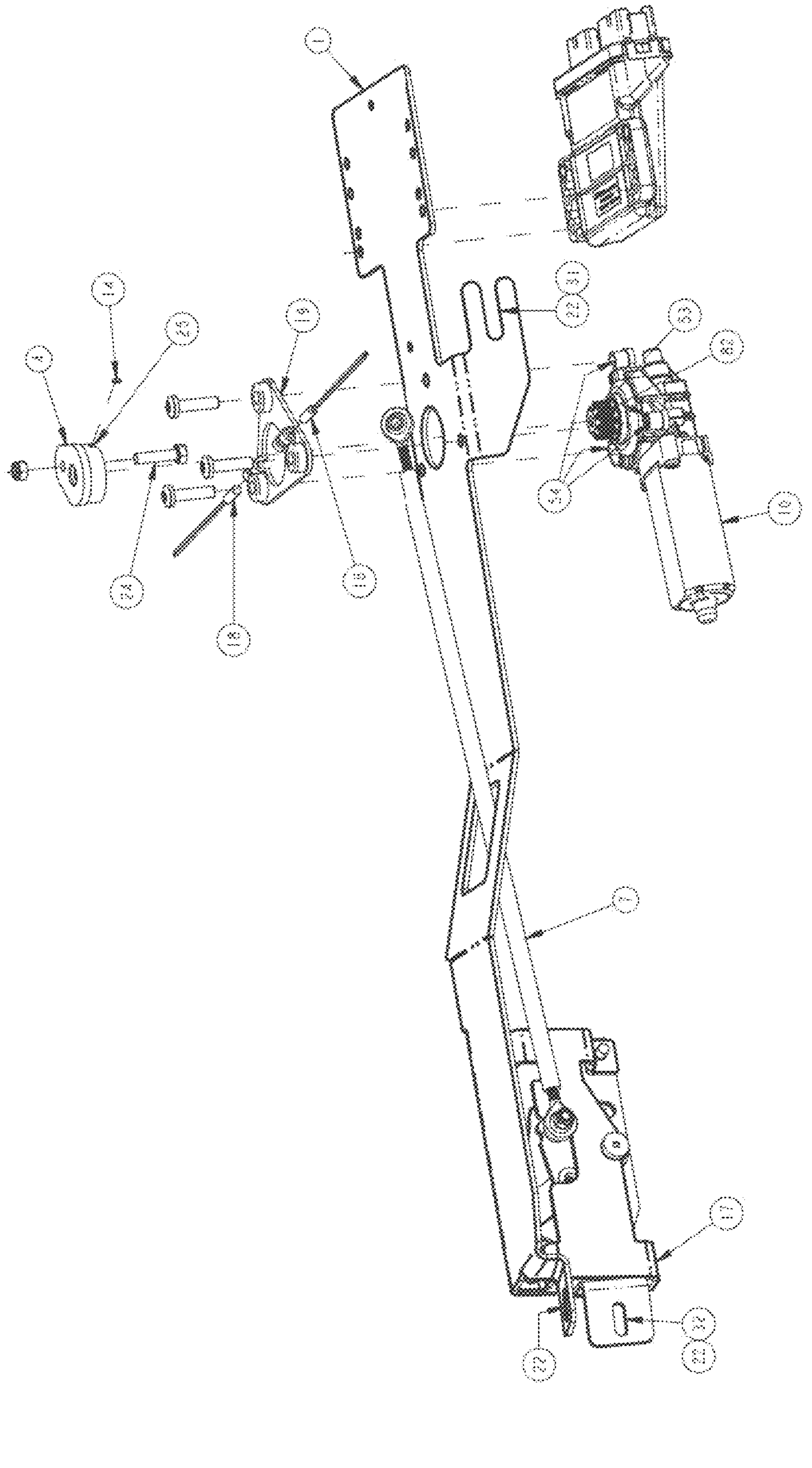
FIG. 13 is an opposite perspective exploded view of the embodiment shown in FIG. 11.
Figure 14:
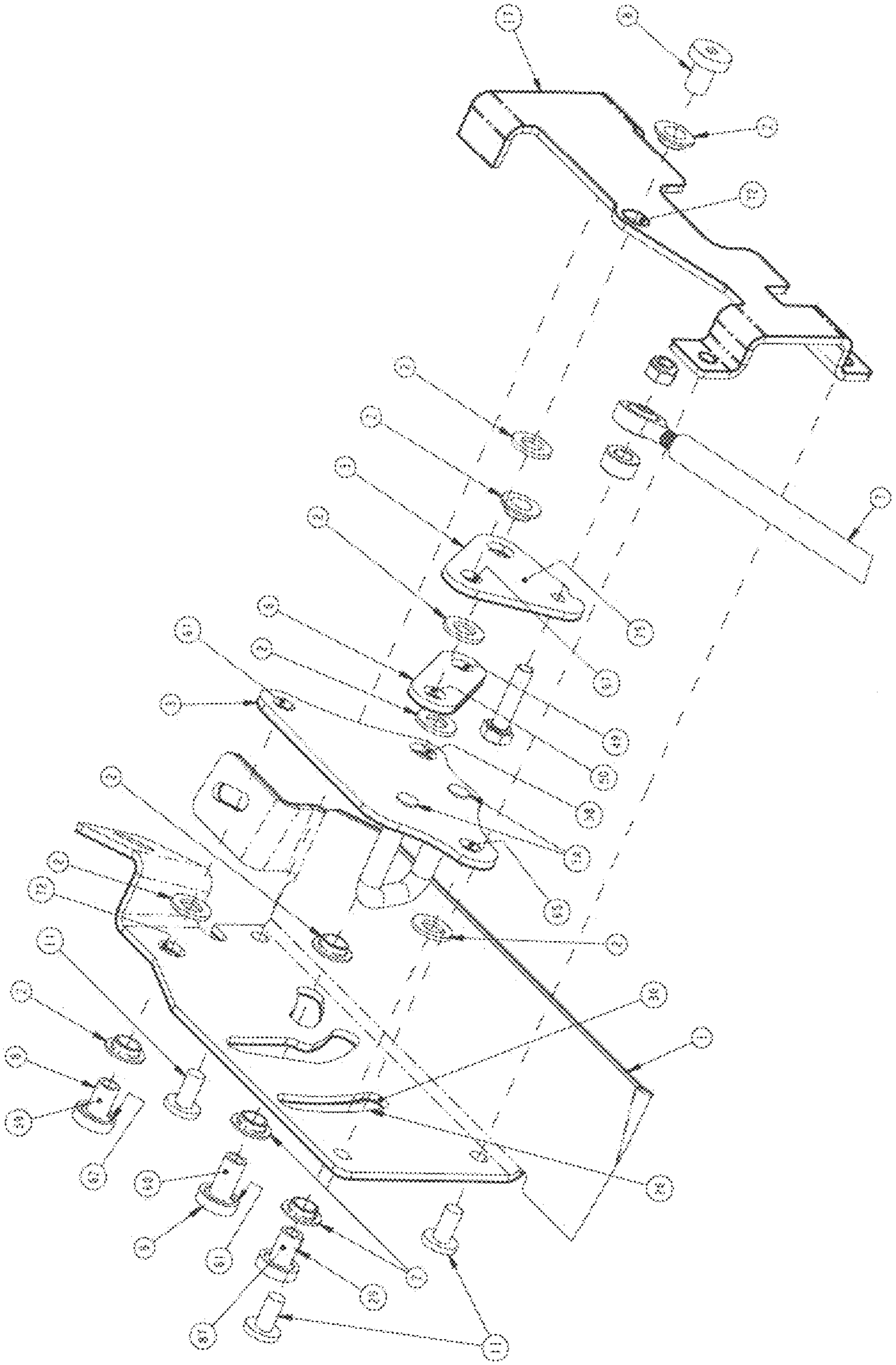
FIG. 14 is an exploded view of the cinching power striker detail of the embodiment of FIGS. 11 and 13, without the full lengths of the mounting plate and connecting rod.

The alternative embodiment shown in FIG. 8 is a compact design that uses a motorized wheeled pin to move a striker bolt between door open and door closed positions. When the latch is closed on the striker, the wheeled pin moves the striker bolt between door open and door closed positions. When the latch is closed on the striker, the wheeled pin then pulls the striker into the door closed position. On release of the latch, the wheeled pin returns the striker to the door open position. Assembly allows adjustment for alignment of the body-mounted striker with the door-mounted latch jaws.

When compared to the embodiments of FIGS. 1-7, the compact design of FIG. 8 reduces the space claim for the cinching mechanism by over 50% while increasing available striker travel by 25%. The compact design also adds separate vertical and horizontal adjustability of the striker relative to the door structure of the vehicle. The compact design greatly reduces the number of necessary components.

The embodiment shown in FIGS. 11-15 is a way to remotely drive a vehicle door striker with an over center mechanism that is mounted on a mount bracket along with the drive motor, cam, drive rod and controller. The package can contain all items fully assembled and the timing of the cinch mechanism in relationship to the motor and inboard/outboard sensors can be adjusted before being sold to the customer. Customer striker adjustability is built in, but does not affect the operational travel of the motor, cam, sensors, and over center striker mechanism. In the case of an electrical failure there has been a pin provided so that the rod could be disconnected from the cam on the motor and bolted solid to the mount frame to maintain the striker inboard position.

Overall System Operational Description

A controller 100 drives a motor assembly 102 that draws (retracts) the door striker 106 into a closed position, and likewise will open (extend) the striker mechanism 106 when the door handle is opened, utilizing magnetically activated reed type micro-switches as controller inputs, to determine position of the latch 104 and the striker 106.

The door latch 104 contains a first magnetically activated switch which provides input to the controller that the latch is in primary position (engaged the striker). The controller 100 will actuate the motor 102 to retract the striker mechanism 106, drawing the door to a closed position. A second magnetically activated switch will detect when the striker/latch mechanism 106/104 has reached the mechanically set closed position. The process for opening the door is similar in operation, except in the opposite direction.

The door cinching assembly provides anti-pinch and a motor reversing feature by monitoring motor supply voltage, current draw and latch/striker state switch status: these parameters will provide the necessary inputs to the controller circuitry, providing the method for automatic motor 102 (latch/striker) reversal if switch detection or motor drive current, exceed system design limits. Exceeding the system design detection limits could result from a mechanical failure or obstruction of the door.

Mechanical System Details

The preferred mechanics of the present invention include:

Closing force: 100-150 lbs.

Speed of closure: total dwell time to open, time to close 3-5 seconds each direction +/−0.5 sec Mechanical Advantage: 2:1

Motor Torque required achieving closing force: 80-120 in lbs.

Rotation: must be able to rotate CW & CCW. Both directions are needed for latch extension/retraction and motor mechanism reversing in the event of a pinched situation.

End of stroke status: system must maintain static position at ends of travel (not back driven, by mechanical "jarring") End of stroke status could be the same input from either latch extended or retracted switch.

Examples of a rotary latch for the present invention is described in Applicant's pending application Ser. No. 15/068,221, which is incorporated herein by reference in its entirety.

System Modes

Figure 16:
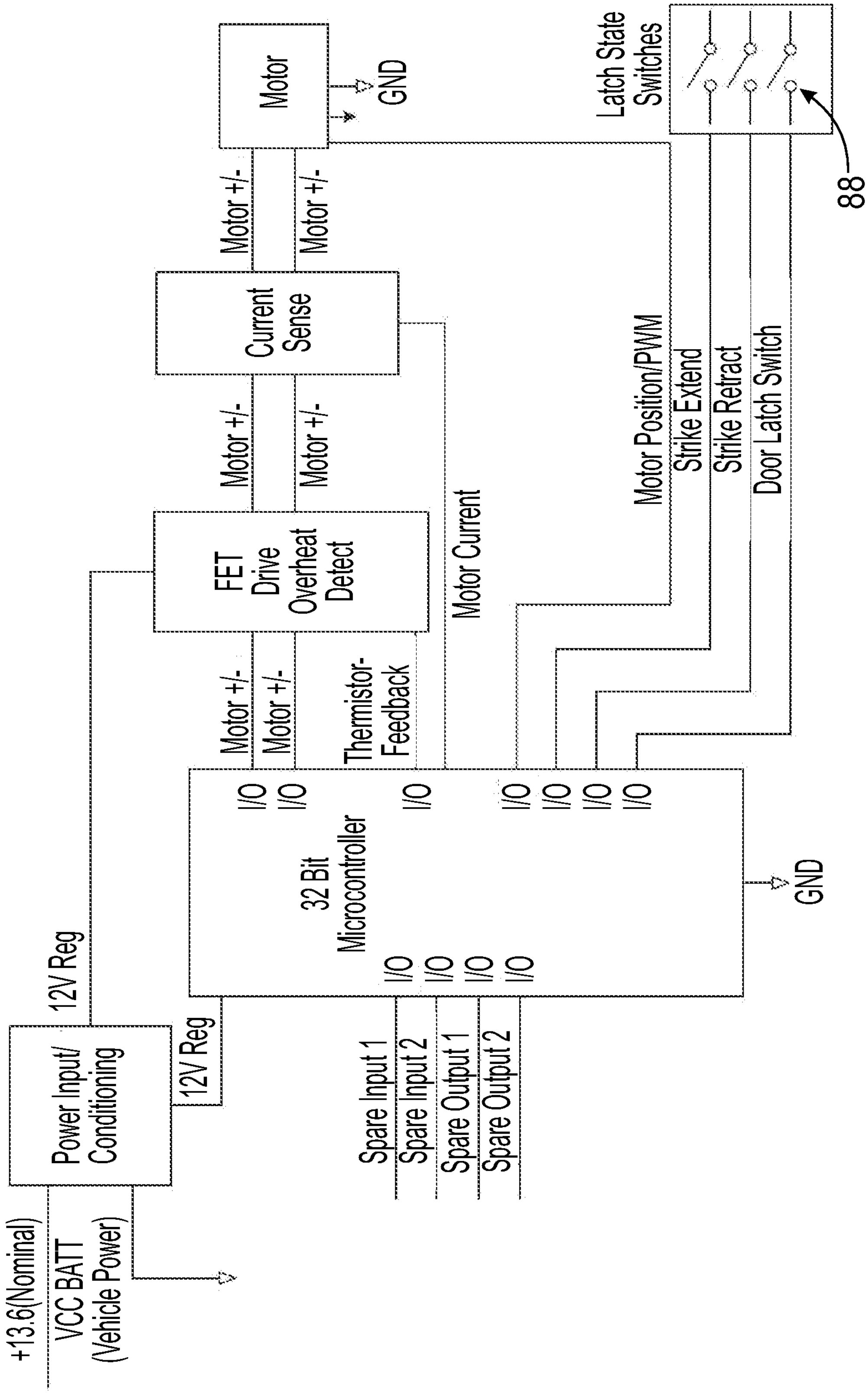
FIG. 16 is an electrical schematic for the control system of the present invention.

FIG. 16 shows the electrical schematic for the control system. The controller 100 and cinch mechanism provide two primary functions or modes of operation. First, the primary function of the cinch mechanism is to provide the ability for the door to open and close at a specified rate, thereby assuring the door seal is properly loaded in the closed position. Second, the controller 100 allows for auto-reversing of the direction the door is moving during the close cycle. The controller 100 monitors the current consumed by the motor 102 and reverses the motor 102 direction if a specified current level is detected.

Normal/Typical Operation

Figure 19:
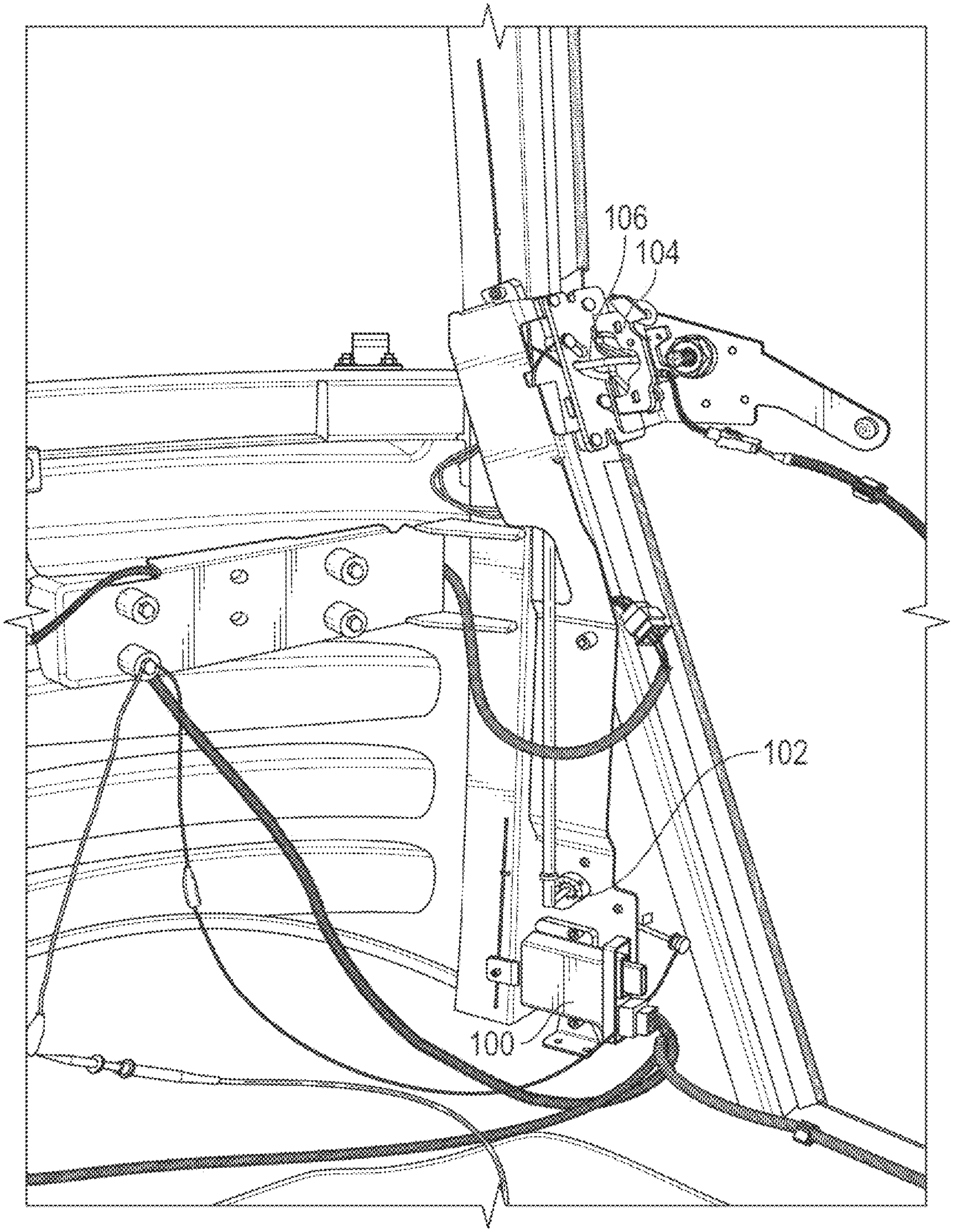
FIG. 19 shows the striker, latch, motor and controller of the present invention.

The following illustrates normal operation of the system. FIG. 19 shows the striker 106, latch 104, motor 102, and controller 100 of the system.

When a door that is utilizing the disclosed system is closed, the striker 106 is retracted, the motor 102 is off, and after a specified period of time the controller 100 enters a sleep mode during which it draws a low current. A typical specified period of time before the controller 100 enters sleep mode is 8 seconds, but alternative times could be utilized.

When a user opens the door handle, the primary latch opens. A change of state in the latch sensor (as particularly shown in FIGS. 17 and 18 appearing on the right side of component 104 in FIG. 17 there are two wires that connect to a small cylinder, which is the latch sensor) triggers the controller 100 to wake up from sleep mode and for the motor 102 to be powered to move the striker 106. If the controller 100 is in sleep mode, it wakes up from sleep mode within a specified period of time. The typical specified period of time in which the controller 100 wakes up is within 100 milliseconds, but alternative amounts of time could be utilized. Motor 102 current draw is continuously monitored while the controller 100 is waking up from sleep mode. The motor 102 is then powered to move the striker 106 to the extended position.

Figure 17:
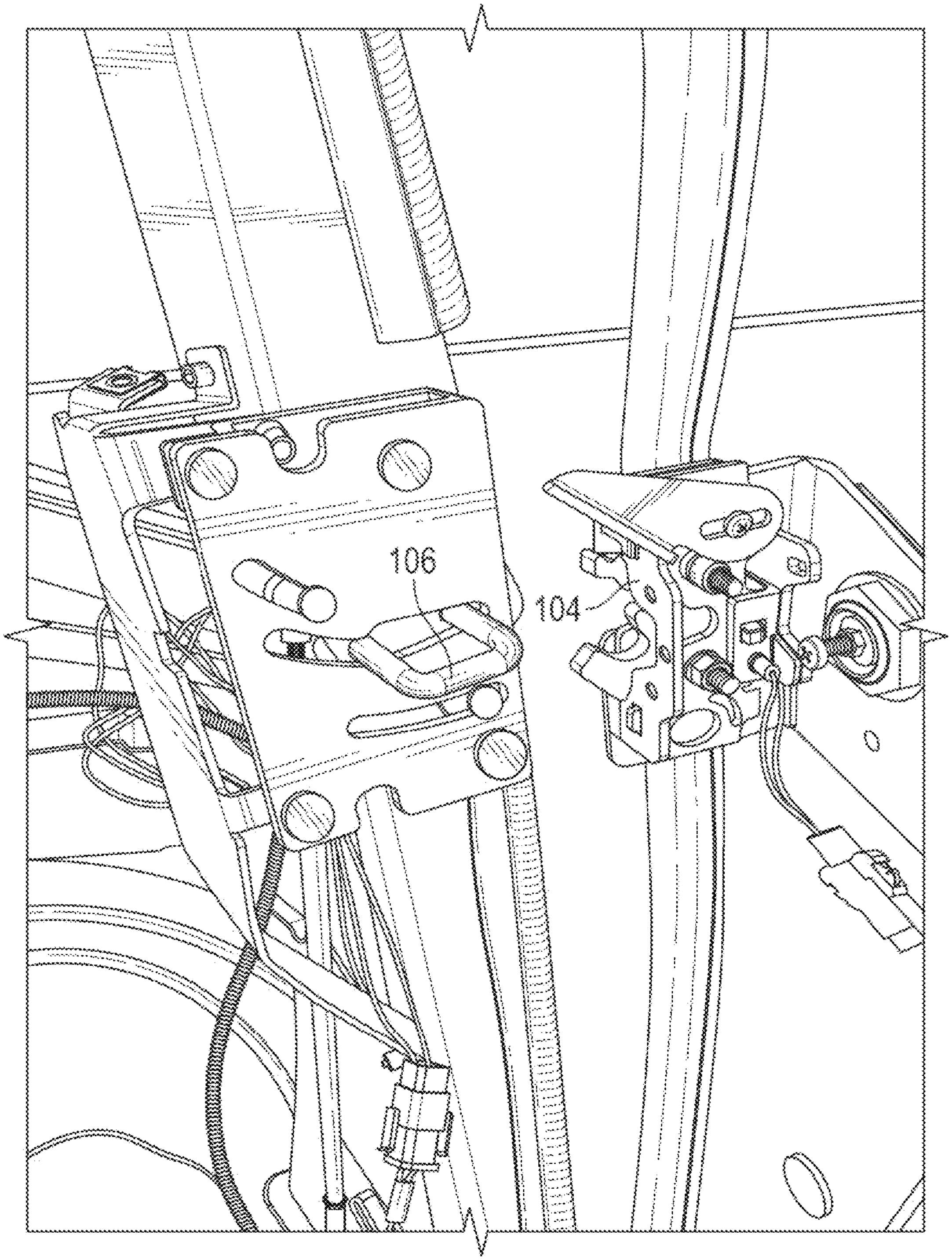
FIG. 17 shows the striker in an extended position.

FIG. 17 shows the striker 106 in an extended position. Inputs sent to the controller 100 are debounced via software so false state changes do not cause unwanted striker 106 movement. The motor 102 rotates both clockwise and counterclockwise to move the striker 106 to the extended (out) and retracted (in) positions. When the striker 106 is extended, the motor 102 stops, and after a specified period of time, the controller 100 enters a sleep mode during which it draws a low current.

Figure 18:
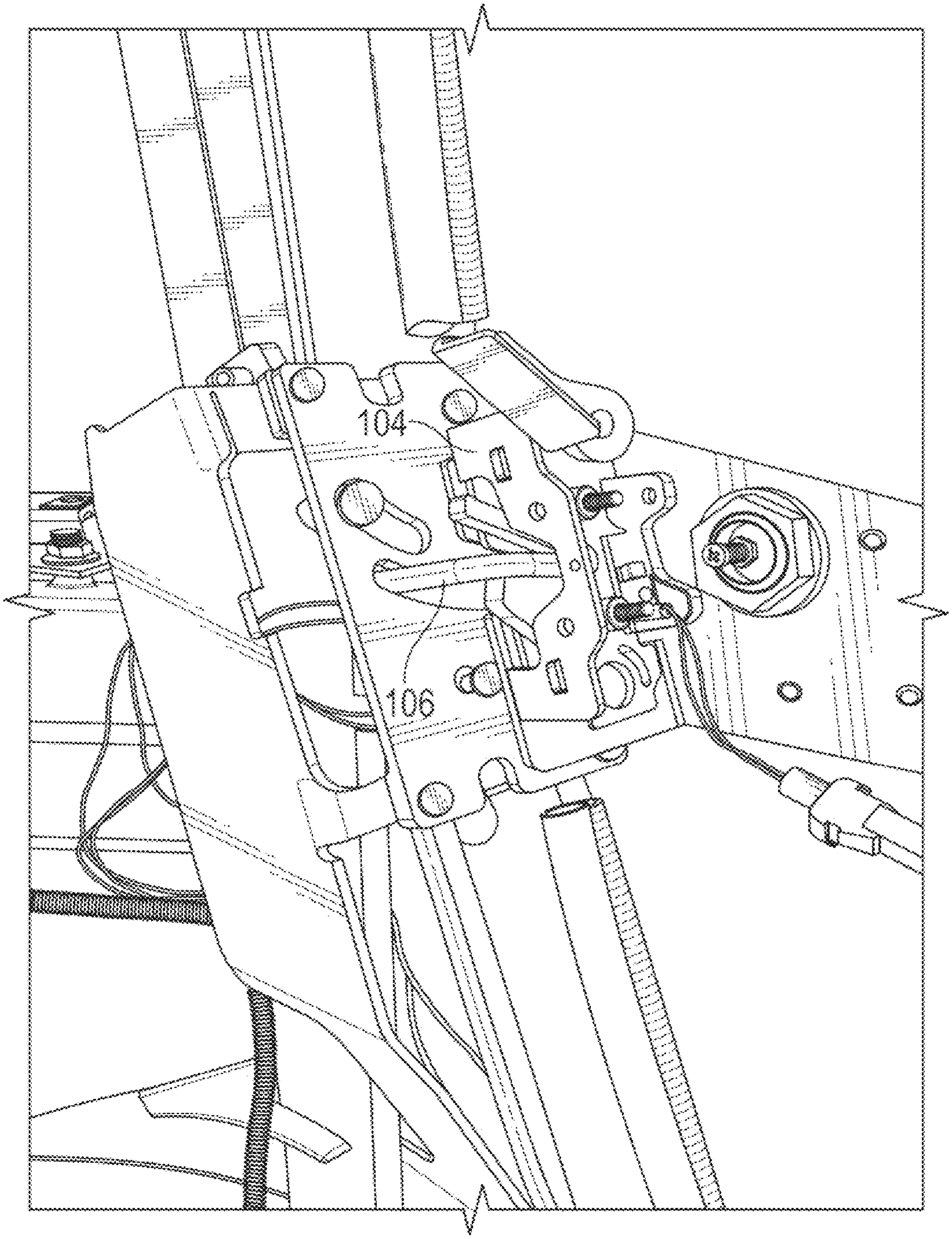
FIG. 18 shows the striker in a retracted position.

When the user pushes the door shut, the primary latch 104 closes. A change of state in the latch sensor triggers the motor 102 to be powered to move the striker 106 to the retracted position. When the striker 106 is retracted, the motor 102 stops and after a specified period of time the controller 100 enters into a sleep mode during which it draws low current. FIG. 18 shows the striker 106 in a retracted position.

Any and all anomalies of the current, force requirements, or travel profile shall be handled per FMVSS 118 if applicable and any other regulatory requirements. No electrical or software calibration shall be required once the assembly leaves the supplier facility. Electronic controller units and electrical components shall be interchangeable without any mechanical, electrical, or software calibrations.

Figure 20:
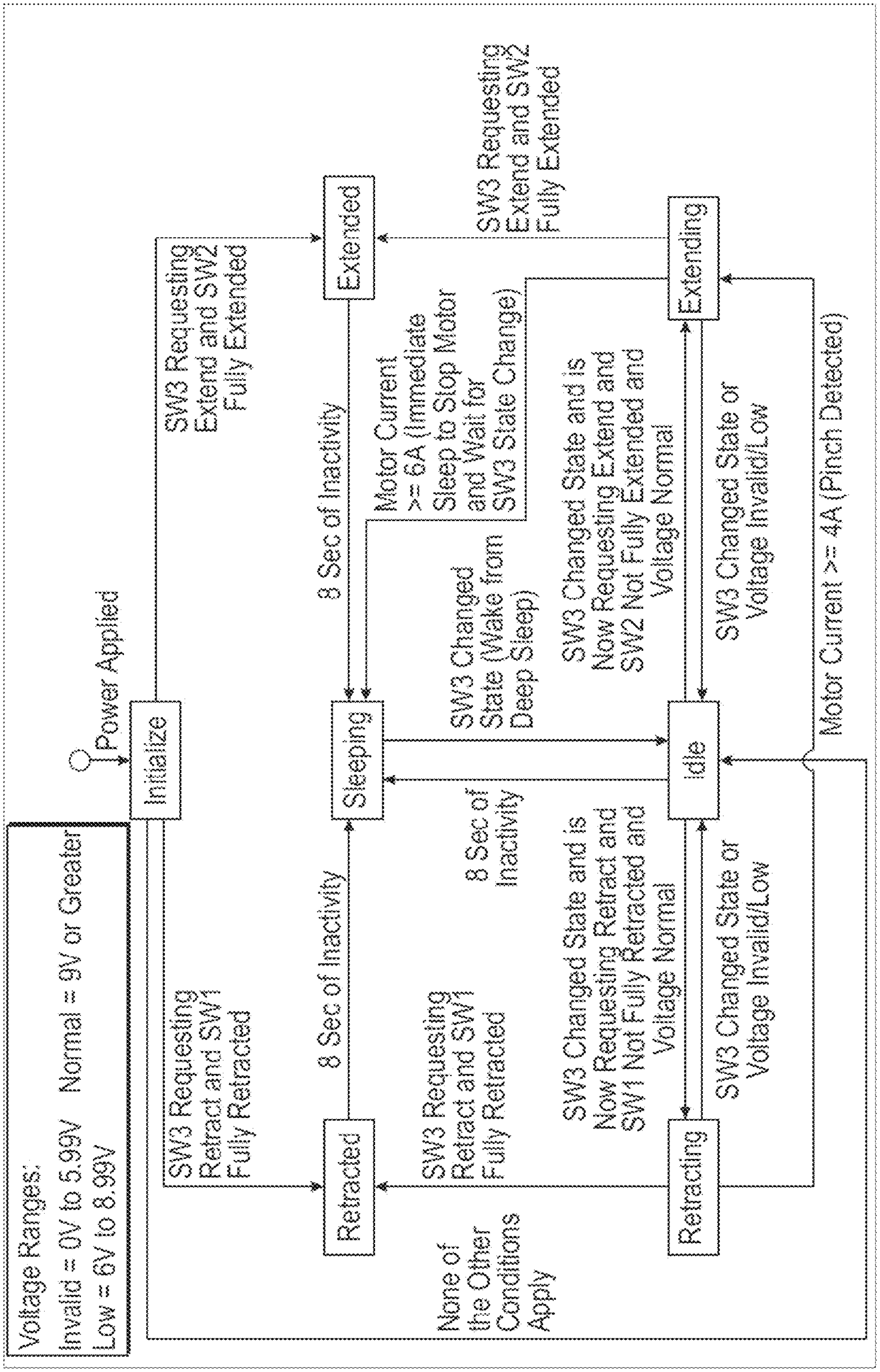
FIG. 20 is a state flow diagram that shows the process by which the system operates.

As FIG. 16 shows, the controller 100 includes a Striker Retract Switch (SW1), a Striker Extend Switch (SW2), and a Door Latch Switch (SW3). FIG. 20 provides a detailed illustration of the state flow diagram of the system. When power is applied to initialize the system, the system either enters a retracted state, an extended state, or remains idle. When the system is initialized, if SW3 is requesting retraction and SW1 is fully retracted, then the system is in a retracted state and the controller 100 then enters sleep mode after a specified time period of inactivity, preferably about 8 seconds. Alternatively, when the system is initialized, if SW3 is requesting extension and SW2 is fully extended, the system is in an extended state and the controller 100 then enters sleep mode after a period of inactivity, preferably about 8 seconds. Finally, if neither of the above conditions are met when the system is initialized, the system remains idle.

Further in view of FIG. 20, when the controller 100 is in sleep mode, if SW3 changes state, the controller 100 wakes up and the system becomes idle. From the idle position, the controller 100 can then enter sleep mode after a time period of inactivity, preferably about 8 seconds. Alternatively, from the idle position, the system can either enter the retracting or extending mode. When the system is idle, if SW3 has changed state and is requesting retraction, SW1 is not fully retracted, and the voltage is normal, then the system begins retracting. When the system is idle, if SW3 changes state and is requesting extension, SW2 is not fully extended, and the voltage is normal, then the system begins extending.

Further in view of FIG. 20, when the system is in the retracting state, it has three options: (1) it can enter the retracted state, (2) it can enter the idle state, or (3) is can enter the extending state. From the retracting state, if SW3 is requesting retraction and SW1 is fully retracted, then the system enters the retracted state. Alternatively, from the retracting state, if SW3 changes state or the voltage is invalid or low, then the system enters the idle state. Alternatively, from the retracting state, if the motor 102 current meets a specified threshold (usually greater than or equal to 4 amps), then the system enters the extending state. When the motor 102 current meets the specified threshold (usually greater than or equal to 4 amps) that means a pinch situation is detected. When the striker 106 is retracting and a pinch situation is detected (based on the motor 102 current), the motor 102 reverses direction, thereby extending the striker 106. This is the anti-pinch auto-reverse feature.

Further in view of FIG. 20, when the system is in the extending state, it has three options: (1) it can enter the extended state, (2) it can enter the idle state, or (3) the controller 100 can enter sleep mode. From the extending state, if SW3 is requesting extension and SW2 is fully extended, then the system enters the extended state. Alternatively, from the extending state, if SW3 changes state and is now requesting extension, SW2 is not fully extended, and voltage is normal, then the system enters the idle state. Alternatively, from the extending state, if the motor current reaches a particular threshold (usually greater than or equal to 6 amps), then the controller 100 enters sleep mode.

Exception to Normal Operation

Figure 15:
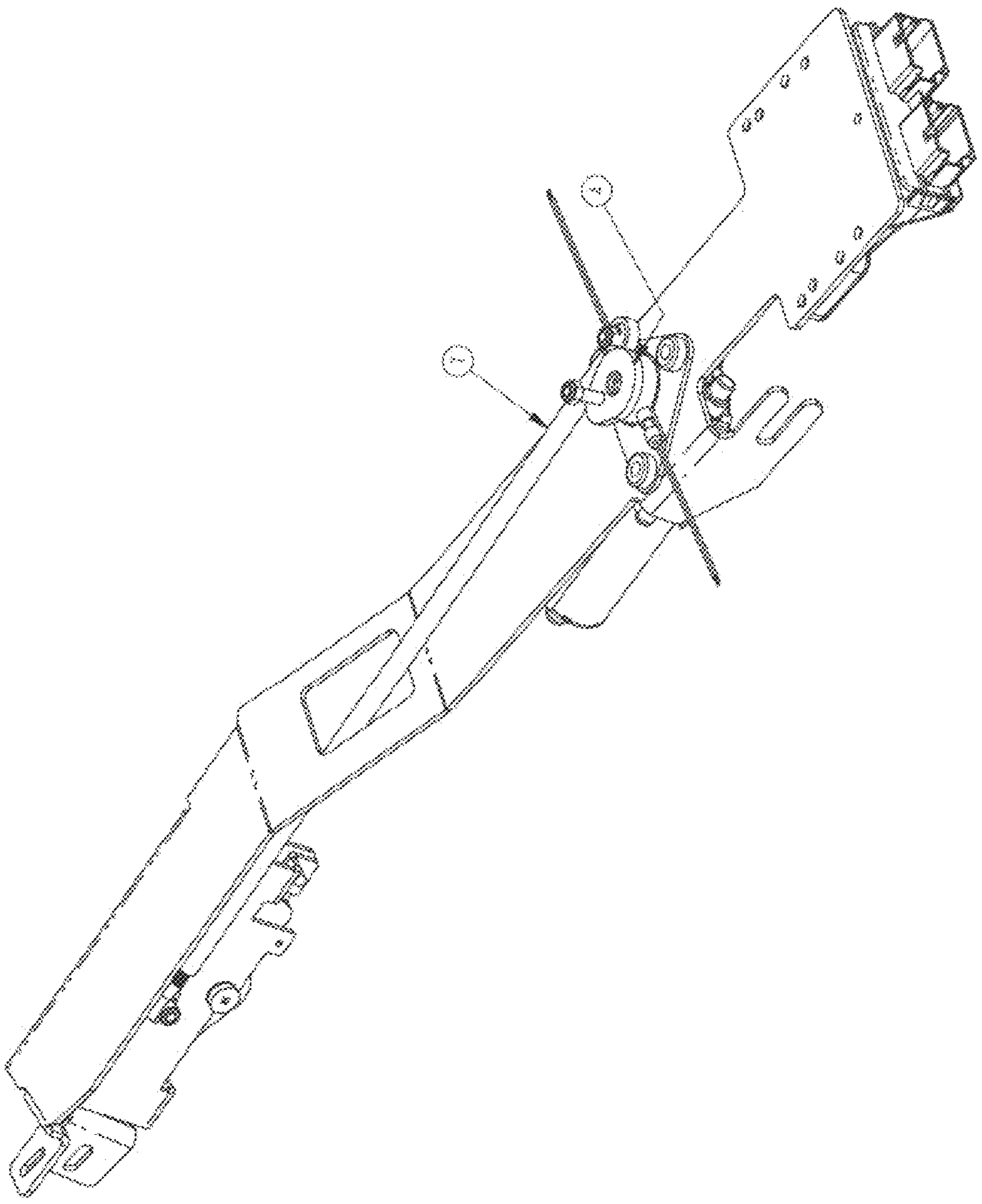
FIG. 15 is a perspective view of the assembly shown in FIG. 11 with the drive link disconnected and secured so as to disable to power of the striker function in the case of motor out of power, controller or other mechanical failure, to allow the operator to still use the vehicle door, with the striker rotated and secured in the retracted position.

The system includes modes of operation other than normal operation. The system includes several safeguards against any potential malfunctions. For example, if the extend or retract commanded motion fails, the system is designed to allow the motor 102 to turn continuously in clockwise or counterclockwise motion without any mechanical interference. If the commanded striker 106 position (extend or retract) is not reached within a certain number of pulses of the motor 102 hall effect sensor, the motor 102 shall stop. If the motor 102 hall effect sensor does not indicate movement after the motor 102 is commanded to move to a position, within a specified period of time, the motor 102 shall be commanded to stop. If the system fails, or there is a power failure, the striker 106 can be mechanically moved to the retracted position, and, therefore, the door will operate as a standard door. FIG. 15 shows an example of the system operating under the condition of system failure due to power failure, motor 102 failure, controller failure, or mechanical failure. FIG. 15 shows that in the event of system failure, the striker 106 can be moved to the retracted position and a user can still open and close the door. FIG. 15 shows the drive link 7 disconnected, thereby disabling the power that allows the striker 106 to be moved automatically. The system allows the striker 106 to be moved to the extended position and stop if the pinch force limit is equal to or greater than a set limit. If motor stall is detected, the power to the motor 102 shall be removed over a set current limit.

Controller System Requirements

The requirements and system configuration for a preferred embodiment of the present invention are based on the following:

a) Vehicle electrical power is supplied to the controller; and the controller supplies motor control/monitoring and electrical power.
b) The system is hard-wired and does not rely upon any RF type of communication.
c) Micro-controller shall be of 32 bit based architecture.
d) Controller current consumption: Active: Controller overhead (TBD) plus requirements to drive motor assembly. The design plan based on an exemplary motor assembly:

External Inputs to controller: All inputs to the controller shall have reverse input protection.

Power (VBatt)
Ground
Latch state switch Retract state switch Extend state
Motor Position/PWM
2 Spare inputs: TTL level Internal Inputs to Controller:

Motor drive current detection
Thermistor (heat sense of motor drive semi-conductors)

Controller Output:

Two wire motor drive, through control FET devices (non mechanical relay system) 2 spare outputs: Positive TTL levels.

General Electrical/Environmental Specifications:

Operating temp −40 to 85 C
Input Voltage: 9-16 VDC
Cinch motor reverse response time: 500 mS.
The reverse response time is the time to transition motor drive direction.
System reaction time: 100 mSec.
The system reaction time is the transition time from controller sleep mode to full active mode.

Sleep Mode:

Quiescent current: 100 uA

Motor Power Drive Circuitry:

5 Amps: continuous drive
10 Amps: intermittent

The motor drive shall be monitored by a semi-conductor device specifically designed to monitor current flow, and preferably, no resistive methods should be utilized.

System Electrical Block Diagram

FIG. 16 is a representation of the controller functionality to be structured, based on the preferred mechanical design described above.

The mechanical design uses two magnetically activated end of travel (extend and retract) reed type switches and one latch switch. The extend and retract reed switches are contained in the same mechanism and the latch switch is located in the door mounted latch assembly.

Software/Firmware Considerations

Continual Characterization Mode:

Due to variations with individual doors, door seals, fit/installation at point of manufacture and mechanical/material wear over time under normal usage, a Continual Characterization mode is provided to account for the mechanical variations. These variations may have an effect on electrical current draw by the striker motor mechanism and door as it contacts the frame door seal. The "Continual Characterization Mode" will function by storing, motor draw current, motor drive voltage and motor timing, in NVM (non-volatile memory), the most recent 5 door cycles: open/close, (close would be by the cinching latch drawing in normal operation).

The Continual Characterization Mode then will have established a normal operating range, considering material characteristics, mechanical and general wear over time. The Continual Characterization Mode will operate automatically, without the need for operator involvement or any special configuration set-up.

Operational Considerations:

Operational conditions shall provide a safe, reliable and robust system.

For example, there may be instances where the motor needs to reverse (automatically) and one (1) instance where the motor drive mechanism will slow its operation:

A. Position sense:

The latch draw is approximately 25 mm. If a current spike is detected before the normal expected peak the motor will reverse direction of travel to the extended (door open) position.

B. Peak load:

A power characterization can be determined and programmed into the controller.

C. Change in logic throughout transfer operation:

This will be tied to the Position sensor; if the slope of the current increases by X % within Y number of motor revolutions, the motor will reverse.

D. Motor drive circuitry overheating "step back" (internal to controller):

Temperature (thermistor) monitoring of the motor drive circuitry (FET's) shall provide input to micro-controller/firmware indicating an overheating condition. If an overheating condition is detected, the controller will reduce the amount of drive resource to the motor, thereby slowing the mechanical operation, but not stopping completely. The controller will continue in the "step back" mode, until the originating overeating condition is normalized.

Firmware Version

Firmware shall have provisions that the following are configurable and adjustable to allow for integration/configuration to other door configurations platforms: This can be accomplished through a UART-Terminal configuration, or similar. Configurable settings shall be implemented, such that source code changes/re-compiling is not required.

The firmware is configurable to incorporate the following provisions: the retract current detection level for setting the anti-pinch limit will vary with motor position input: the extend current detection level is a hard limit to prevent mechanical damage: source voltage monitoring: motor pulse count for extend: motor pulse count for retract: peak current; and motor drive current.

Drive Current Detection, Motor Speed, and Auto-Reversing

The controller shall monitor drive current continuously during movement operations. If, during the extend drive function the motor drive current reaches a predetermined and configurable limit, then the controller 100 shall command the motor 102 to stop. If, during the retract drive function the drive current or motor speed reaches certain configurable limits based on position, voltage, and ambient temperature, then the controller 100 shall command the motor 102 to reverse direction toward the extended position and stop once the extended position is achieved. This is another representation of the anti-pinch auto-reverse feature. In addition to motor current, the speed (RPM) of the motor 102 can be used to detect a pinch situation. A pinch situation is detected if the speed of the motor 102 reaches a configurable threshold. If the slope of the drive current increases by a particular percentage within a particular number of motor revolutions, then the motor 102 will reverse in direction.

The controller 100 shall use additional motor position and speed (RPM) information, provided by the motor position sense Hall-Effect output, to determine allowable speed reduction limits to differentiate between normal closing speeds, and abnormal closing speeds. An abnormal or quick speed reduction will indicate that an object has obstructed the door's closing path. The force on an object in the door will never exceed 100 Newtons. When the controller 100 determines the speed is abnormal or abrupt the controller 100 will command the motor 102 to reverse and move the striker to the extend position. Several factors that can affect speed reduction limits include: variations in door seal loading, variations in system voltage, variations in ambient temperature, and variations in anti-pinch force limits due to changes in the mechanical advantage associated with the striker movement.

Several conditions can cause the mechanism to reverse the direction of the motor 102 when no obstacle is actually present in the closure path. Extreme cold weather can cause erratic or no operation due to the added resistance in the mechanism caused by grease viscosity in the mechanism. Additionally, the door gaskets can become stiffer and the motor 102 can experience slower speed due to cold ambient temperature. The controller 100 can monitor the ambient temperature to adjust the reverse algorithm so that at lower temperatures the motor will not reverse without an object in the doors closing path.

Motor

An example of a striker motor is: Bosch AHC 12V 0 390 203 045. This motor has position PWM output, which shall be used as an input to the microcontroller circuitry. The output is a PWM duty cycle based on motor armature rotation Standards and Regulations The system (mechanical and electrical) shall meet the requirements of customers, such as commercial vehicle manufactures in the agriculture/construction and heavy truck industries.

Both tactile and motor-controlled anti-pinch systems are used today as standard protection systems that avert the danger electric door and window openers present. Should an object (organic or in-organic) interfere or become "trapped" within the opening while the door or window is closing: the anti-pinch systems cause the automatic movement to come to a halt.

The FMVSS 118, CMVSS 118 and 74/60/EEC standards and directives establish the requirements for power operated window, partitions and roof panel systems, their purpose being to prevent injury arising from trapping situations. They give a description of not only how the systems run but the operating requirements, the test pieces, readings and test set up. Should an object get trapped while the automatic closing function is being carried out, a reversal must come about before the trapping force has reached 100 N. This requirement is verified using a semi-rigid cylindrical test rod, from 4 to 200 mm in diameter. This test rod is put through the opening from the inside of the vehicle, normally at a right angle, in such a way that its cylindrical surface contacts all parts of the frame of the opening component.

The present invention also meets these standards:

SAE Documents.

The below listed SAE documents are listed, for reference purposes. 2004-01-1108 Anti-pinch protection for power operated features 2009-01-0637 Anti-pinch direct sensor solutions The invention has been shown and described above with the preferred embodiments, and it is understood that many modifications, substitutions, and additions may be made which are within the intended spirit and scope of the invention. From the foregoing, it can be seen that the present invention accomplishes at least all of its stated objectives.

What is claimed is:

1. An electronic controller assembly for a motorized striker of a vehicle door or window closure, the striker being adapted to be moved by a motor between extended and retracted positions and adapted to engage and disengage a latch on the vehicle door or window closure, the electronic controller assembly comprising:

a controller to control the motor, actuate the striker, and monitor parameters of the assembly;

a latch switch integrated into the latch, and is operatively connected to the controller to send a signal to the controller corresponding to the latch position;

a striker retract switch operatively connected to the controller to signal when the striker is in the retracted position; and a striker extend switch operatively connected to the controller to signal when the striker is in the extended position;

wherein the controller actuates the striker motor in response to the signal from the latch switch, and input from the striker retract switch and the striker extend switch;

wherein the controller automatically reverses the motor to extend the striker if, during a retract drive function, the one or more monitored parameters reaches a certain configurable limit;

a temperature sensor operatively connected to the electronic controller assembly to monitor ambient weather temperature, whereby the electronic controller assembly determines a nominal motor speed based on the ambient temperature to prevent motor reversal due to cold weather temperatures; and the parameters including drive current of the striker motor, speed of the striker motor, voltage of the striker motor, and ambient temperature.

2. The electronic controller assembly of claim 1, wherein the latch switch, the striker retract switch, and/or the striker extend switch are magnetically activated.

3. A method of controlling movement of a motorized striker on a vehicle door or window closure frame in which the striker is adapted to engage and disengage a latch assembly on the door or window closure, the method comprising:

sensing a state change of the latch assembly;

sending a signal to a controller corresponding to the position of the latch assembly;

sensing the position of the striker via a striker extend switch and a striker retract switch, and sending input to the controller corresponding to that position;

monitoring ambient weather temperature and motor speed, and determining a nominal motor speed based on the ambient temperature, and then adjusting a motor reverse algorithm in response to the motor speed to preclude motor stoppage when no obstructions resides within the closure.

4. The method of claim 3, wherein the striker extend switch and the striker retract switch are magnetically activated.

5. The method of claim 3, further comprising actuating a striker motor in response to the position of the latch assembly and input regarding the position of the striker.

6. The method of claim 3, further comprising monitoring motor drive current.

7. The method of claim 6, further comprising automatically reversing the motor to extend the striker if, during a retract drive function, the monitored parameters reaches a certain configurable limit.

8. The method of claim 3, further comprising monitoring voltage.

* * * * *